United States Patent
Yun et al.

(10) Patent No.: US 12,436,692 B2
(45) Date of Patent: Oct. 7, 2025

(54) PEAK POWER MANAGEMENT DATA BURST COMMUNICATION

(71) Applicant: Micron Technology, Inc., Boise, ID (US)

(72) Inventors: Hojung Yun, San Jose, CA (US); Liang Yu, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 61 days.

(21) Appl. No.: 18/234,522

(22) Filed: Aug. 16, 2023

(65) Prior Publication Data
US 2024/0061593 A1 Feb. 22, 2024

Related U.S. Application Data

(60) Provisional application No. 63/399,257, filed on Aug. 19, 2022.

(51) Int. Cl.
*G06F 3/06* (2006.01)
(52) U.S. Cl.
CPC .......... *G06F 3/0625* (2013.01); *G06F 3/0653* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 6,587,905 B1 | 7/2003 | Correale, Jr. et al. | |
| 6,816,829 B1 * | 11/2004 | Clark | G06F 30/33 703/21 |
| 8,788,779 B1 * | 7/2014 | Horn | G06F 3/0655 713/321 |
| 8,850,134 B1 * | 9/2014 | Murdock | G06F 12/04 711/201 |
| 9,401,184 B1 | 7/2016 | Erez | |
| 9,418,712 B1 | 8/2016 | Erez | |
| 9,455,027 B1 | 9/2016 | Mattos et al. | |
| 10,068,624 B2 | 9/2018 | Kwon | |

(Continued)

FOREIGN PATENT DOCUMENTS

WO 2019079378 A1 4/2019

*Primary Examiner* — Yaima Rigol
(74) *Attorney, Agent, or Firm* — Lowenstein Sandler LLP

(57) ABSTRACT

A memory device includes memory dies. Each memory die includes a memory array and control logic, operatively coupled with the memory array, to perform operations for implementing peak power management (PPM) data burst communication. The operations include monitoring a data burst with respect to the memory array, detecting a current reservation trigger associated with the data burst, in response detecting the current reservation trigger, reserving an initial amount of current reflecting a maximum current consumption value associated with a maximum data transfer speed of the data burst, detecting a plurality of input/output cycles of the data burst following the preamble period, and in response to detecting the number of input/output cycles, reserving, based on an analysis of the plurality of input/output cycles, a subsequent amount of current reflecting an actual current consumption value associated with an actual data transfer speed of the data burst.

20 Claims, 11 Drawing Sheets

(56) References Cited

U.S. PATENT DOCUMENTS

| | | | |
|---|---|---|---|
| 10,860,417 B1 | 12/2020 | Spirkl et al. | |
| 2003/0217295 A1* | 11/2003 | Sadowski | G06F 1/28 |
| | | | 713/300 |
| 2007/0060145 A1* | 3/2007 | Song | H04W 52/346 |
| | | | 455/445 |
| 2008/0073975 A1* | 3/2008 | Wight | G06F 13/385 |
| | | | 307/32 |
| 2016/0291658 A1* | 10/2016 | Kim | H04L 12/4637 |
| 2016/0372160 A1* | 12/2016 | Lehmann | G11C 5/14 |
| 2019/0034111 A1 | 1/2019 | Catthoor et al. | |
| 2019/0065080 A1* | 2/2019 | Tanpairoj | G06F 12/0246 |
| 2020/0342985 A1 | 10/2020 | Toth et al. | |
| 2020/0379926 A1 | 12/2020 | Gopalakrishnan | |
| 2022/0164117 A1 | 5/2022 | Guo et al. | |
| 2022/0199192 A1 | 6/2022 | Binfet et al. | |
| 2022/0413583 A1 | 12/2022 | Hassan et al. | |
| 2023/0038894 A1 | 2/2023 | Lu et al. | |
| 2023/0195317 A1 | 6/2023 | Yu | |

* cited by examiner

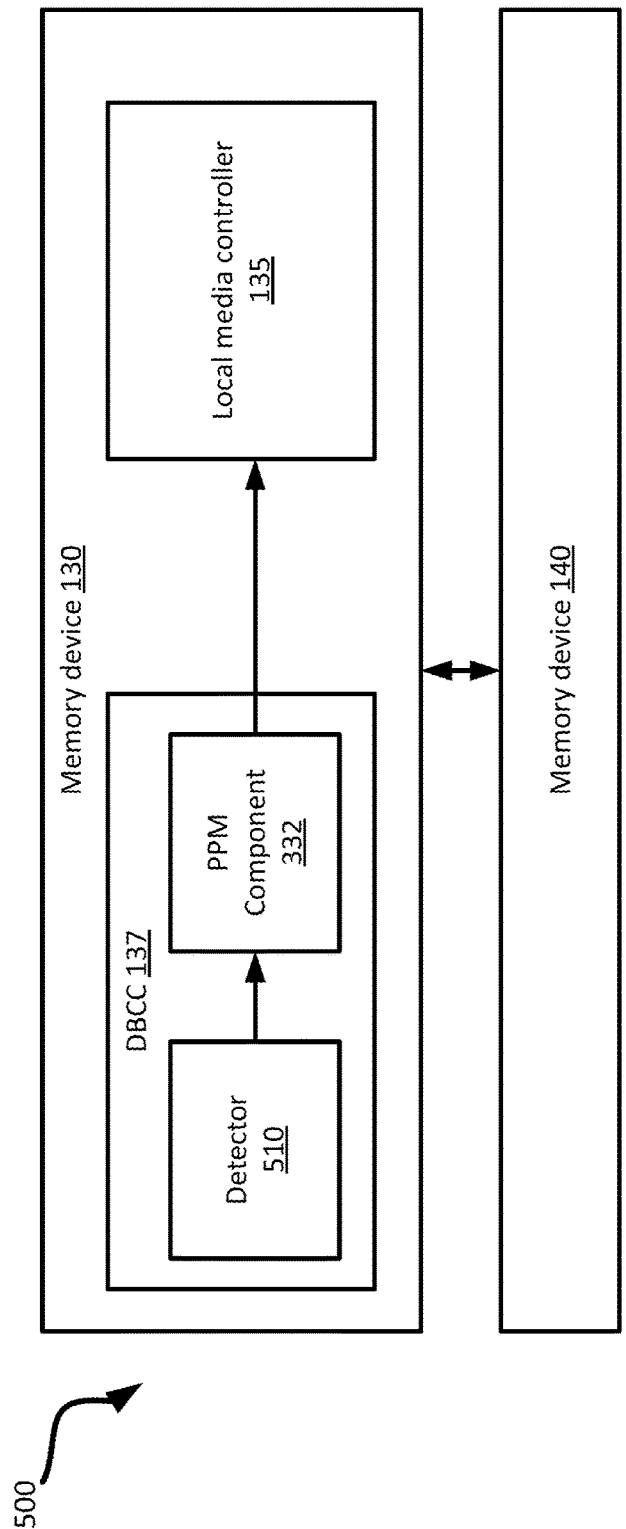

PEAK POWER MANAGEMENT DATA BURST COMMUNICATION

CROSS-REFERENCE TO RELATED APPLICATION(S)

The present application claims the benefit of U.S. Provisional Application 63/399,257, filed on Aug. 19, 2022 and entitled "PEAK POWER MANAGEMENT DATA BURST COMMUNICATION", the entire contents of which are incorporated by reference herein.

TECHNICAL FIELD

Embodiments of the disclosure relate generally to memory sub-systems, and more specifically, relate to peak power management (PPM) data burst communication in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 5-6 are diagrams illustrating peak power management (PPM) data burst communication, in accordance with some embodiments of the present disclosure.

DETAILED DESCRIPTION

Figure 1A:
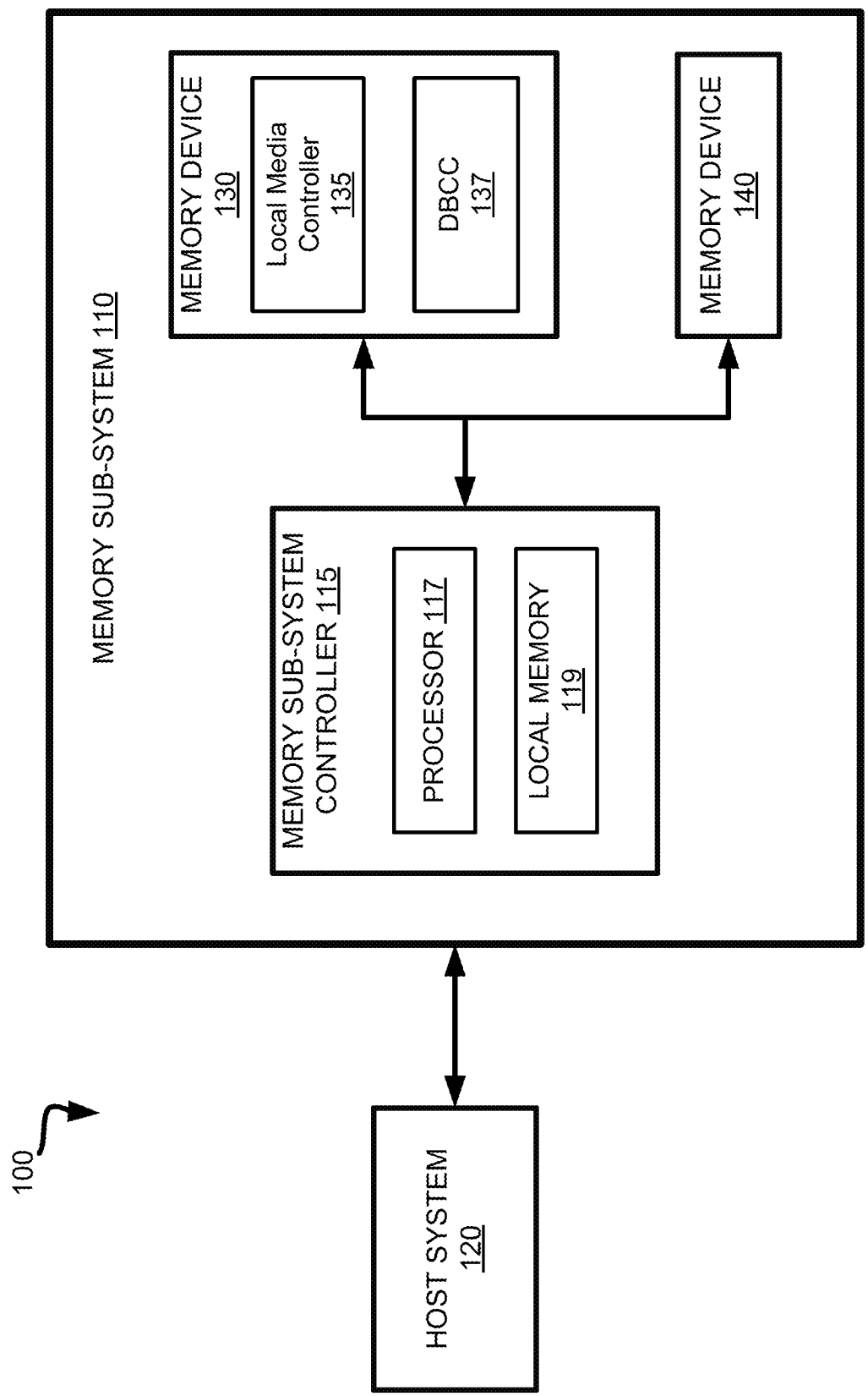
FIG. 1A illustrates an example computing system that includes a memory sub-system in accordance with some embodiments of the present disclosure.

Aspects of the present disclosure are directed to peak power management (PPM) data burst communication in a memory device. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. The memory cells are formed onto a silicon wafer in an array of columns (also hereinafter referred to as bitlines) and rows (also hereinafter referred to as wordlines). A wordline can refer to one or more conductive lines of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane. As these processing threads operate independently, the power usage and requirements associated with each processing thread also varies.

A memory device can be a three-dimensional (3D) memory device. For example, a 3D memory device can be a three-dimensional (3D) replacement gate memory device (e.g., 3D replacement gate NAND), which is a memory device with a replacement gate structure using wordline stacking. For example, a 3D replacement gate memory device can include wordlines, select gates, etc. located between sets of layers including a pillar (e.g., polysilicon pillar), a tunnel oxide layer, a charge trap (CT) layer, and a dielectric (e.g., oxide) layer. A 3D replacement gate memory device can have a "top deck" corresponding to a first side and a "bottom deck" corresponding to a second side. For example, the first side can be a drain side and the second side can be a source side. Data in a 3D replacement gate memory device can be stored as 1 bit/memory cell (SLC), 2 bits/memory cell (MLC), 3 bits/memory cell (TLC), etc.

Various access lines, data lines and voltage nodes can be charged or discharged very quickly during sense (e.g., read or verify), program, and erase operations so that memory array access operations can meet the performance specifications that are often required to satisfy data throughput targets as might be dictated by customer requirements or industry standards, for example. For sequential read or programming, multi-plane operations are often used to increase the system throughput. As a result, a memory device can have a high peak current usage, which might be four to five times the average current amplitude. Thus, with such a high average market requirement of total current usage budget, it can become challenging to concurrently operate more than a certain number of memory dies ("dies") of a memory device.

Peak power management (PPM) can be utilized as a technique to manage power consumption of a memory device containing multiple dies, many of which rely on a controller to stagger the activity of the dies seeking to avoid performing high power portions of memory access operations concurrently in more than one die. A PPM system can implement a PPM communication protocol, which is an inter-die communication protocol that can be used for limiting and/or tracking current or power consumed by each die. Each die can include a PPM component that exchanges information with its own local media controller (e.g., NAND controller) and other PPM components of the other dies via a communication bus. Each PPM component can be configured to perform power or current budget arbitration for the respective die. For example, each PPM component can implement predictive PPM to perform predictive power budget arbitration for the respective memory device.

The PPM communication protocol can employ a token ring protocol. The token ring protocol is a token-based round robin protocol, whereby each PPM component rotates as a holder of a PPM token in accordance with a token circulation time period. Circulation of the token among the memory devices can be controlled by a common clock signal ("ICLK"). For example, the dies can include a designated primary die that generates the common clock signal received by each active PPM component, with the remaining dies being designated as secondary dies. The token circulation time period can be defined by a number of clock cycles of the common clock signal, and the memory device can pass the token to the next memory device after the number of clock cycles has elapsed.

A die counter can be used to keep track of which die is holding the token. Each die counter value can be univocally associated with a respective die by utilizing a special PPM address for each die. The die counter can be updated upon the passing of the token to the next die.

While holding the token, the PPM component broadcasts, to the other dies, information encoding the amount of current used by its respective die during a given time period (e.g., a quantized current budget). The information can be broadcast using a data line. For example, the data line can be a high current (HC #) data line. The amount of information can be defined by a sequence of bits, where each bit corresponds to the logic level of a data line signal (e.g., an HC # signal) at a respective clock cycle (e.g., a bit has a value of "0" if the HC # signal is logic low during a clock cycle, or a value of "1" if the clock pulse is logic high during a clock cycle). For example, if a die circulates the token after three clock cycles, then the information can include three bits. More specifically, a first bit corresponds to the logic level of the HC # signal during a first clock cycle, a second bit corresponds to the logic level of the HC # signal during a second clock cycle, and a third bit corresponds to the logic level of the HC # signal during the third clock cycle. Accordingly, the token circulation time period (e.g., number of clock cycles) can be defined in accordance with the amount of information to be broadcast by a holder of the token (e.g., number of bits).

While holding the token, the PPM component can issue a request for a certain amount of current to be reserved in order to execute a memory access operation. The system can have a designated maximum current budget, and at least a portion of the maximum current budget may be currently reserved for use by the other memory dies. Thus, an available current budget can be defined as the difference between the maximum current budget and the total amount of reserved current budget during the current token circulation cycle. If the amount of current of the request is less than or equal to the available current budget during the current cycle, then the request is granted and the local media controller can cause the memory access operation to be executed. Otherwise, if the amount of current of the new request exceeds the available current budget, then the local media controller can be forced to wait for sufficient current budget to be made available by the other die(s) to execute the memory access operation (e.g., wait at least one current token circulation cycle).

Each PPM component can maintain the information broadcast by each die (e.g., within respective registers), which enables each die to calculate the current consumption. For example, if there are four dies Die 0 through Die 3, each Die 0 through Die 3 can maintain information broadcast by Die 0 through Die 3 within respective registers designated for Die 0 through Die 3. Since each of Die 0 through Die 3 maintains the maximum current budget the most updated current consumption, each of Die 0 through Die 3 can calculate the available current budget. Accordingly, each of Die 0 through Die 3 can determine whether there is a sufficient amount of available current budget for its local media controller to execute a new memory access operation.

A memory access operation (e.g., program operation, read operation or erase operation) can include multiple sub-operations arranged in an execution sequence. For example, the sub-operations can include an initial sub-operation to initiate the memory access operation, a final sub-operation to complete the memory access operation. The sub-operations can further include at least one intermediate sub-operation performed between the initial sub-operation and the final sub-operation. For each sub-operation, for the local media controller to determine whether there is sufficient available current budget to proceed with execution of the sub-operation, the sub-operation can be assigned a current breakpoint. Each current breakpoint is defined (e.g., as a PPM parameter during initialization of PPM) at the beginning of its respective sub-operation to indicate whether the sub-operation will consume more current, less current, or the same amount of current as the previous sub-operation. Accordingly, current breakpoints can be used as a gating mechanism to control execution of a memory access operation.

For example, a high current (HC) breakpoint indicates that its respective sub-operation will be consuming an amount of current that is greater than the amount of current consumed to execute the previous sub-operation. Thus, the PPM component may have to reserve additional current to enable the local media controller to execute the sub-operation. For example, a first HC breakpoint can be defined with respect to an initial sub-operation of the memory access operation, since the initial sub-operation will necessarily consume a greater amount of current than the zero amount of current that was being consumed immediately before requesting execution of the memory access operation. Upon reaching a HC breakpoint, the local media controller can communicate, with the PPM component, the amount of current that the memory device will be consuming to execute the respective sub-operation. The local media controller waits to receive a response (e.g., flag) indicating that there is sufficient available current budget that can be reserved for executing the respective sub-operation. Upon receiving the response from that PPM component that there is sufficient available current budget that can be reserved for executing the respective sub-operation, the local media controller can proceed with executing the respective sub-operation. Accordingly, the local media controller will execute a sub-operation at a HC breakpoint only if the PPM component indicates that there is sufficient available current in the current budget to do so.

In contrast to a HC breakpoint, a low current (LC) breakpoint indicates that its respective sub-operation will be consuming an amount of current that is less than or equal to the amount of current consumed to execute the previous sub-operation. Since the PPM component had already reserved enough current for executing the previous sub-operation, the local media controller will, upon reaching a LC breakpoint, proceed with executing the respective sub-operation using at least a portion of the already reserved current. However, the local media controller still communicates, with the PPM component, the amount of current that the memory device will be consuming to perform the sub-operation. For example, the PPM component can release an unused portion of the reserved current for the other dies.

Illustratively, if the memory access operation is a read operation, then the read operation can include a prologue sub-operation as the initial sub-operation, a read initialization sub-operation following the prologue sub-operation, a sensing sub-operation following the read initialization sub-operation, and a read recovery sub-operation following the sensing sub-operation. Respective HC breakpoints can be defined for the prologue sub-operation (as the initial sub-operation) and the read initialization sub-operation (since the read initialization sub-operation consumes more current than the prologue sub-operation). Respective LC breakpoints can be defined for the sensing sub-operation (since the sensing sub-operation does not consume more current than the read initialization sub-operation) and the read recovery sub-operation (since the read recovery sub-operation does not consume more current than the sensing sub-operation).

The memory sub-system can include a memory device interface between the memory sub-system controller and a memory device (e.g., NAND memory device) to process multiple different signals relating to one or more transfers or communications with the memory device. For example, the interface can process signals relating to memory access commands (e.g., command/address cycles) to configure the memory device to enable the transfer of raw data in connection with a memory access operation (e.g., a read operation, a program operation, etc.). The interface can implement a multiplexed interface bus including a number of bidirectional input/output (I/O) pins that can transfer address, data and instruction information between the memory sub-system controller and the memory device (e.g., local media controller and I/O control). The I/O pins can be output pins during read operations, and input pins at other times. For example, the interface bus can be an 8-bit bus (I/O [7:0]) or a 16-bit bus (I/O [15:0]).

The interface can further utilize a set of command pins to implement interface protocols. For example, the set of command pins can include a Chip Enable (CE #) pin, an Address Latch Enable (ALE) pin, a Command Latch Enable (CLE) pin, a Write Enable (WE #) pin, a Read Enable (RE #) pin, a data strobe signal (DQS) pin. Additional pins can include, for example, a write protection (WP #) pin that controls hardware write protection, and a ready/busy (RB #) pin that monitors device status and indicates the completion of a memory access operation (e.g., whether the memory device is ready or busy).

The "#" notation indicates that the CE #, WE #, #RE and WP # pins are active when set to a logical low state (e.g., 0 V), also referred to as "active-low" pins. Therefore, the ALE, CLE and DQS pins are active when set to a logical high state (e.g., greater than 0 V), also referred to as "active-high" pins. Asserting a pin can include setting the logical state of the pin to its active logical state, and de-asserting a pin can include setting the logical state of the pin to its inactive logical state. For example, an active-high pin is asserted when set to a logical high state ("driven high") and de-asserted when set to a logical low state ("driven low"), while an active-low pin is asserted when to set to a logical low state ("driven low") and de-asserted when set to a logical high state ("driven high").

CE #, WE #, RE #, CLE, ALE and WP # signals are control signals that can control read and write operations. For example, the CE # pin is an input pin that gates transfers between the host system and the memory device. For example, when the CE # pin is asserted and the memory device is not in a busy state, the memory device can accept command, data and address information. When the memory device is not performing an operation, the CE # pin can be de-asserted.

The RE # pin is an input pin that gates transfers from the memory device to the host system. For example, data can be transferred at the rising edge of RE #. The WE # pin is an input pin that gates transfers from the host system to the memory device. For example, data can be written to a data register on the rising edge of WE # when CE #, CLE and ALE are low and the memory device is not busy.

The ALE pin and the CLE pin are respective input pins. When the ALE pin is driven high, address information can be transferred from the bus into an address register of the memory device upon a low-to-high transition on the WE # pin. More specifically, addresses can be written to the address register on the rising edge of WE # when CE # and CLE are low, ALE is high, and the memory device is not busy. When address information is not being loaded, the ALE pin can be driven low. When the CLE pin is driven high, information can be transferred from the bus to a command register of the memory device. More specifically, commands can be written to the command register on the rising edge of WE # when CE # and ALE are low, CLE is high, and the memory device is not busy. When command information is not being loaded, the CLE pin can be driven low. Accordingly, a high CLE signal can indicate that a command cycle is occurring, and a high ALE signal can indicate that an address input cycle is occurring.

One type of data transfer is a data burst transfer ("data burst"), which refers to a continuous set of data input or data output transfer cycles that are performed without pause. A data burst can be initiated by specifying a set of parameters including a starting memory address from where to begin the data transfer, and an amount of data to be transferred. After the data burst is initiated, it runs to completion, using as many interface bus transactions as necessary to transfer the amount of data designated by the set of parameters. Due at least in part to specifying the set of parameters, the data burst process can generate an overhead penalty with respect to pre-transfer instruction execution. However, since the data burst can continue without any processor involvement after the initiation, processing resources can be freed up for other tasks. One example of a data burst is a read burst. Another example of a data burst is a write burst.

Host interface speed (i.e., input/output (I/O) speed) has been increasing as memory devices become more advanced (e.g., doubling every generation). Thus, the memory device interface speed has to increase to match the host interface speed. During a data burst, there is a direct relationship between data transfer speed (e.g., data cycle frequency) and current consumption, such that current consumption can increase as a function of data transfer speed. In some memory devices implementing PPM, a PPM component of a die of a PPM network may be unable to determine how much current to reserve for consumption with respect to a data burst. Although a theoretical maximum amount of current to be consumed during a data burst can be determined for each channel (e.g., empirically during experimentation), reserving the theoretical maximum amount of current for the data burst can negatively impact performance overhead. For example, in some cases, the total current consumption can exceed the total current budget for the entire PPM network. Additionally, consuming more than a necessary amount of current can impact the ability of other dies to reserve current for handling their own memory access operations.

Aspects of the present disclosure address the above and other deficiencies by implementing peak power management (PPM) data burst communication in a memory device. For example, a die of a PPM network can include a data burst communication component (DBCC) operatively coupled to a local media controller. The DBCC can include detector circuitry ("detector"), and a PPM component operatively coupled to the detector. The die can further include a local media controller operatively coupled to the PPM component.

Generally, the detector can detect a data burst (e.g., read burst or write burst) from a host system (e.g., via a memory sub-system controller). As will be described in further detail below, the detector can send to the PPM controller via a communication protocol, a data burst timing mode ("timing mode") value. The timing value identifies a timing mode, and the timing mode reflects a data transfer speed (e.g., I/O speed) category for the data burst. A data transfer speed category defines at least one data transfer speed for the respective timing mode. For example, a data transfer speed category can define a range of data transfer speeds. Upon receiving the timing mode value from the detector, the PPM component can convert the timing mode value into a current consumption value defined for the timing mode (i.e., data transfer speed category). More specifically, the current consumption value reflects an amount of current to be reserved from the total current budget of the PPM network for the timing mode. Thus, the PPM component can use the token ring protocol to reserve the amount of current for the data burst from the available current budget of the PPM network. After successfully reserving the amount of current, the PPM component can cause the local media controller to handle the data burst.

More specifically, since the detector does not know the actual data transfer speed of the data burst when it is first detected, the detector can initially send a maximum timing mode value to the PPM component upon initially detecting a current reservation trigger based on an analysis of a set of control signals. In some embodiments, detecting the current reservation trigger includes detecting a preamble period of the data burst (e.g., after an idle period). In some embodiments, detecting the current reservation trigger include detecting a data I/O start command. The maximum timing mode value identifies a maximum timing mode reflecting a theoretical maximum data transfer speed for the data burst. Upon receiving the maximum timing mode value, the PPM component can convert the maximum timing mode value into a maximum current consumption value that reflects the theoretical maximum amount of current to be reserved for handling the theoretical maximum data transfer speed for the data burst. The PPM component can set the maximum current consumption value as an initial amount of current for the data burst, and can reserve the initial amount of current by communicating the initial amount of current to the other PPM components of the PPM network using the token ring protocol. If the available current budget within the PPM network is less than the initial amount of current, then the PPM component can wait until there is sufficient available current budget within the PPM network before causing the local media controller to handle the data burst. For example, the PPM component can wait for enough current budget to be released by the other PPM components of the PPM network before causing the local media controller to handle the data burst.

After detecting the current reservation trigger, the detector can then analyze a number of I/O cycles of the data burst to determine an actual timing mode reflecting an actual data transfer speed category. The detector can send, to the PPM component via the communication protocol, an actual timing mode value identifying the actual timing mode. One example of an actual timing mode value is an idle value identifying an idle timing mode reflecting an idle data transfer speed category. For example, if the detector detects an idle period (e.g., a data pause occurs or the data burst goes into its postamble period), then the detector can send the idle value to the PPM component. Other examples of actual timing mode values include a low-speed value identifying a low-speed timing mode reflecting a low data transfer speed category, a mid-speed value identifying a mid-speed timing mode reflecting an intermediate data transfer speed category, and a high-speed value identifying a high-speed timing mode reflecting a high data transfer speed category. As an illustrative example, the low data transfer speed category can define data transfer speeds of greater than 0 transfers per second (T/s) and less than about 800 megatransfers per second (MT/s), the intermediate data transfer speed category can define data transfer speeds of greater than or equal to about 800 MT/s and less than about 2400 MT/s, and the high data transfer speed category can define data transfer speeds of greater than or equal to about 2400 MT/s. In such embodiments, the maximum data transfer speed can be greater than or equal to 3600 MT/s.

Upon receiving the actual timing mode value, the PPM component can convert the actual timing mode value into an actual current consumption value. To convert timing mode values (e.g., actual timing mode values), the die can store a current consumption data structure maintaining respective relationships between actual timing mode values and current consumption values. In some embodiments, the current consumption data structure is a trim table. For example, a base current consumption value (e.g., PPM current consumption resolution) can be predetermined, and each actual current consumption value can be a function the base current consumption value (e.g., a respective multiple of the base current consumption value). Illustratively, a multiplier of 0 can be assigned to the idle value, a multiplier of A can be assigned to the low-speed value, a multiplier of B can be assigned to the intermediate speed value, and a multiplier of C can be assigned to the high-speed value, where $0<A<B<C$. If the base current consumption value is X milliamperes (mA), then the current consumption value for the idle value is 0, the current consumption value for the low-speed value is AX, the current consumption value for the intermediate speed value is BX, and the current consumption value for the high-speed value is CX.

After determining the actual current consumption value, the PPM component set the actual current consumption value as an amount of current, and can reserve the amount of current by communicating the amount of current to the other PPM components of the PPM network using the token ring protocol. Since the initial amount of current was set as the maximum current consumption value, the amount of current is less than or equal to the initial amount of current. Thus, the PPM component has already reserved sufficient current for the actual timing mode, and the PPM component can cause the local media controller to handle the data burst using the amount of current without having to wait for any additional current budget to be made available. Moreover, the PPM component can release a portion of the initial amount of current back into the PPM network for use by the other dies. More specifically, the portion of the initial amount of current reflects the difference between the initial amount of current and the amount of current.

The detector can continuously monitor the data burst and send a new actual timing mode value to the PPM component, in a manner similar to that described above. Upon receiving the new actual timing mode value, the PPM component can convert the new actual timing mode value into a new actual current consumption value, set the new actual current consumption value as a new amount of current, and reserve the new amount of current by communicating the new amount of current to the other PPM components of the PPM network using the token ring protocol. If the amount of current that was previously reserved by the PPM component is greater than or equal to the new amount of current, then the PPM component has already reserved sufficient current for the local media controller to handle the data burst. Thus, the PPM component can cause the local media controller to handle the data burst using the amount of current. Moreover, the PPM component can release a portion of the amount of current that was previously reserved back into the PPM network for use by the other dies (i.e., the difference between the amount of current that was previously reserved and the new amount of current). Otherwise, if the amount of current that was previously reserved by the PPM component is less than the new amount of current, then the PPM component has not reserved sufficient current for the local media controller to handle the data burst. Thus, the PPM component can reserve an additional amount of current equal to the difference between the new amount of current and the previous amount of current, and cause the local media controller to handle the data burst after reserving the additional amount of current. If the additional amount of current is greater than the available current budget of the PPM network, then the PPM component may have to wait for other die(s) of the PPM network to release enough current budget.

The communication protocol between the detector and the PPM component can be implemented by using a set of data burst communication signals. Each data burst communication signal can communicate a bit pattern representing a timing mode value (e.g., maximum or actual). In some embodiments, the bit pattern is a two-bit pattern representing four timing modes (e.g., idle, low-speed, mid-speed and high-speed). For example, the two-bit pattern can be represented by values 0x0, 0x1, 0x2 and 0x3, where the prefix "0x" indicates that the following value is a hexadecimal value. For example, 0x0 can represent the idle timing mode, 0x1 can represent the low-speed timing mode, 0x2 can represent the mid-speed timing mode, and 0x3 can represent the high-speed timing mode. However, such an example should not be considered limiting. Further details regarding PPM data burst communication will be described in further detail below with reference to FIGS. 1A-7.

Advantages of the present disclosure include, but are not limited to, improved memory sub-system performance and QoS. For example, embodiments described herein can enable a PPM component of a die of a PPM network to reserve an appropriate amount of current for consumption during a data burst.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can be operatively coupled to a data burst communication component (DBCC) 137 to implement PPM data burst communication. In such an embodiment, DBCC 137 can be implemented using hardware or as firmware, stored on memory device 130, executed by the control logic (e.g., local media controller 135) to perform the operations related to performing a memory access operation during PPM as described herein. In some embodiments, the memory sub-system controller 115 includes at least a portion of DBCC 137. For example, the memory sub-system controller 115 can include a processor 117 (e.g., a processing device) configured to execute instructions stored in local memory 119 for performing the operations described herein. Further details regarding implementing PPM data burst communication will now be described below with reference to FIGS. 1B-7C.

Figure 1B:
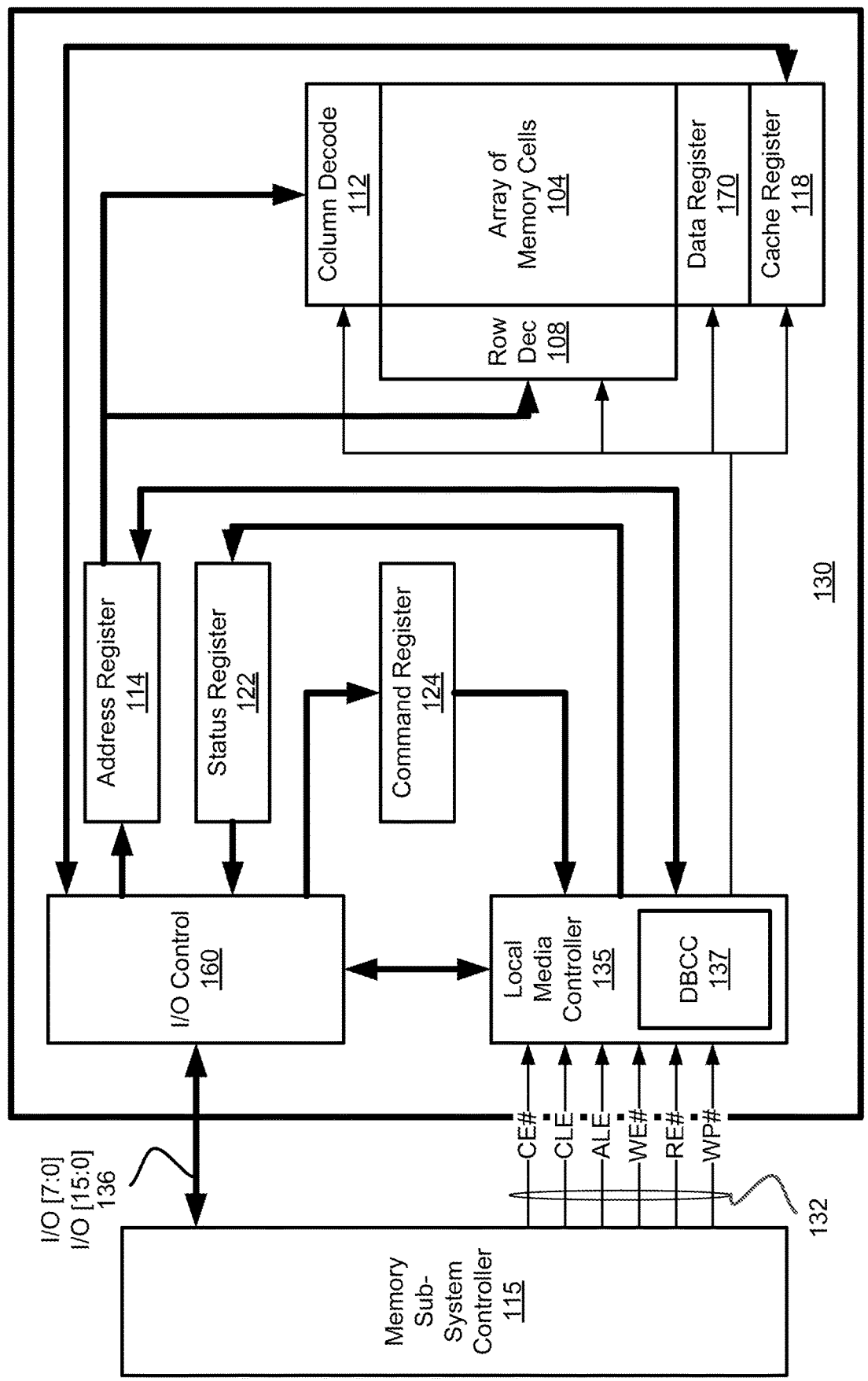
FIG. 1B is a block diagram of a memory device in communication with a memory sub-system controller of a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 112 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 112 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 112 to control the row decode circuitry 108 and column decode circuitry 112 in response to the addresses. In one embodiment, local media controller 135 includes the DBCC 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

The DBCC 137 can implement PPM data burst communication for handling data bursts within the PPM network framework. For example, the DBCC 137 can monitor a data burst received from the host system 120 of FIG. 1A via the memory sub-system controller 115. The data burst corresponds to a memory access operation with respect to the memory array 104. For example, the data burst can be a read burst to read data from the memory array 104, or a write burst to write data to the memory array 104.

The DBCC 137 can detect a current reservation trigger by analyzing a set of control signals. For example, the set of control signals can include one or more of: CE #, CLE, ALE, WE #, RE #, WP #, etc. In some embodiments, detecting the current reservation trigger includes detecting a preamble period of the data burst (e.g., after an idle period). In some embodiments, detecting the current reservation trigger include detecting a data I/O start command.

The DBCC 137 can, upon detecting the current reservation trigger (e.g., preamble period or the data I/O start command), reserve an initial amount of current. For example, the DBCC 137 can set a maximum current consumption value as the initial amount of current, and reserve the initial amount of current by communicating the initial amount of current to at least the memory device 140 via a token ring protocol. The maximum current consumption value can reflect a theoretical maximum current consumption for the data burst. More specifically, the maximum current consumption value reflects a maximum data transfer speed of the data burst. In some embodiments, the maximum data transfer speed can be greater than or equal to about 3600 MT/s. If there is sufficient available current budget within the PPM network, then the initial amount of current can be reserved immediately. If there is insufficient available current budget within the PPM network, there may be a delay until sufficient current budget is made available within the PPM network (e.g., after at least the memory device 140 releases extra current budget).

After reserving the initial amount of current, the DBCC 137 can continue monitoring the data burst to detect a number of I/O cycles of the data burst following the detection of the current reservation trigger. The DBCC 137 can then reserve a subsequent amount of current. For example, the DBCC 137 can, in response to detecting the number of I/O cycles, set an actual current consumption value as the subsequent amount of current, and reserve the subsequent amount of current by communicating the subsequent amount of current to at least the memory device 140 via the token ring protocol. Since the actual current consumption value is less than or equal to the maximum current consumption value, there is already sufficient current budget reserved by the die to reserve the actual current consumption value. A portion of the initial amount of current can be released to increase the available current budget of the PPM network (i.e., the difference between the maximum current consumption value and the actual current consumption value).

More specifically, the DBCC 137 can reserve the subsequent amount of current by identifying an actual timing mode by analyzing the number of I/O cycles, and converting the actual timing mode into the actual current consumption value. The actual timing mode reflects an actual data transfer speed category. One example of an actual timing mode is an idle timing mode reflecting an idle data transfer speed category. Examples of actual timing mode values include a low-speed timing mode reflecting a low data transfer speed category, a mid-speed timing mode reflecting an intermediate data transfer speed category, and a high-speed timing mode reflecting a high data transfer speed category. As an illustrative example, the low data transfer speed category can define data transfer speeds of greater than 0 T/s and less than about 800 MT/s, the intermediate data transfer speed category can define data transfer speeds of greater than or equal to about 800 MT/s and less than about 2400 MT/s, and the high data transfer speed category can define data transfer speeds of greater than or equal to about 2400 MT/s.

In some embodiments, converting the actual timing mode into the actual current consumption value can include converting an actual timing mode value defining the actual timing mode into the actual current consumption value using a current consumption data structure. For example, the current consumption data structure can be used to translate the actual timing mode value (e.g., bit pattern) into the actual timing mode, and then translate the actual timing mode into the actual current consumption value. Translating the actual timing mode into the actual current consumption value can include determining the actual current consumption value from a base current consumption value. For example, the current consumption data structure can assign each actual timing mode with a respective multiplier, and the actual current consumption value for the actual timing mode can be determined by multiplying the base current consumption value by its corresponding multiplier. Illustratively, a multiplier of 0 can be assigned to the idle value, a multiplier of A can be assigned to the low-speed value, a multiplier of B can be assigned to the intermediate speed value, and a multiplier of C can be assigned to the high-speed value, where $A<B<C$. If the base current consumption value is X mA, then the actual current consumption value for the idle value is 0, the actual current consumption value for the low-speed value is AX, the actual current consumption value for the intermediate speed value is BX, and the actual current consumption value for the high-speed value is CX.

After reserving the subsequent amount of current, the DBCC 137 can continue monitoring the data burst. For example, the DBCC 137 can continue monitoring the data burst to detect a postamble period of the data burst following the number of I/O cycles. More specifically, the DBCC 137 can detect the postamble period by analyzing the set of control signals. The postamble period can correspond to an idle timing mode of the data burst. Upon detecting the postamble period, the DBCC 137 can reserve a final amount of current for the data burst. For example, the DBCC 137 can, in response to detecting the postamble period, set an idle current consumption value as the final amount of current, and reserve the final amount of current by communicating the final amount of current to at least the memory device 140 via the token ring protocol. The idle current consumption value is less than the subsequent current consumption value. For example, the idle current consumption value can be 0 mA. Since the idle current consumption value is less than or equal to the actual current consumption value, then at least a portion of the subsequent amount of current can be released to increase the available current budget of the PPM network (i.e., the difference between the actual current consumption value and the idle current consumption value). Further details regarding the operation of the DBCC 137 will be described below with reference to FIGS. 3-7A.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

For example, in some embodiments, as will be described in further detail below with reference to FIGS. 3-7C, the DBCC 137 can include a detector and a PPM component. The detector can monitor the data burst and detect respective periods of the data burst from the monitoring. The PPM component can reserve the respective amounts of current for handling the data burst (e.g., the initial amount of current as a maximum current consumption value after the detector detects the preamble period, the subsequent amount of current after the detector determines an actual current consumption value, and the final amount of current after the detector detects the postamble period).

Figure 2A:
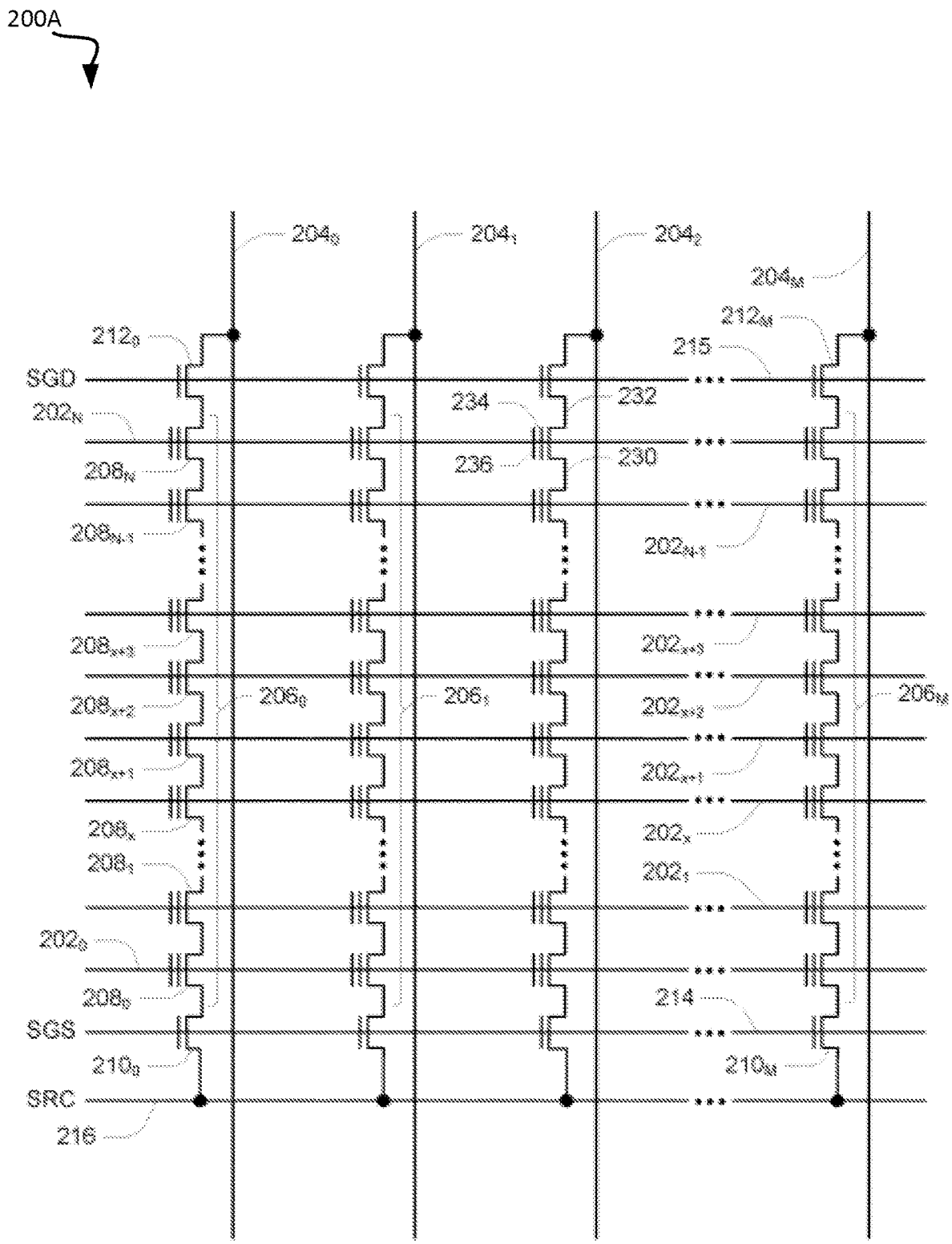
FIGS. 2A-2C are diagrams of portions of an example array of memory cells included in a memory device, in accordance with some embodiments of the present disclosure.
Figure 2B:
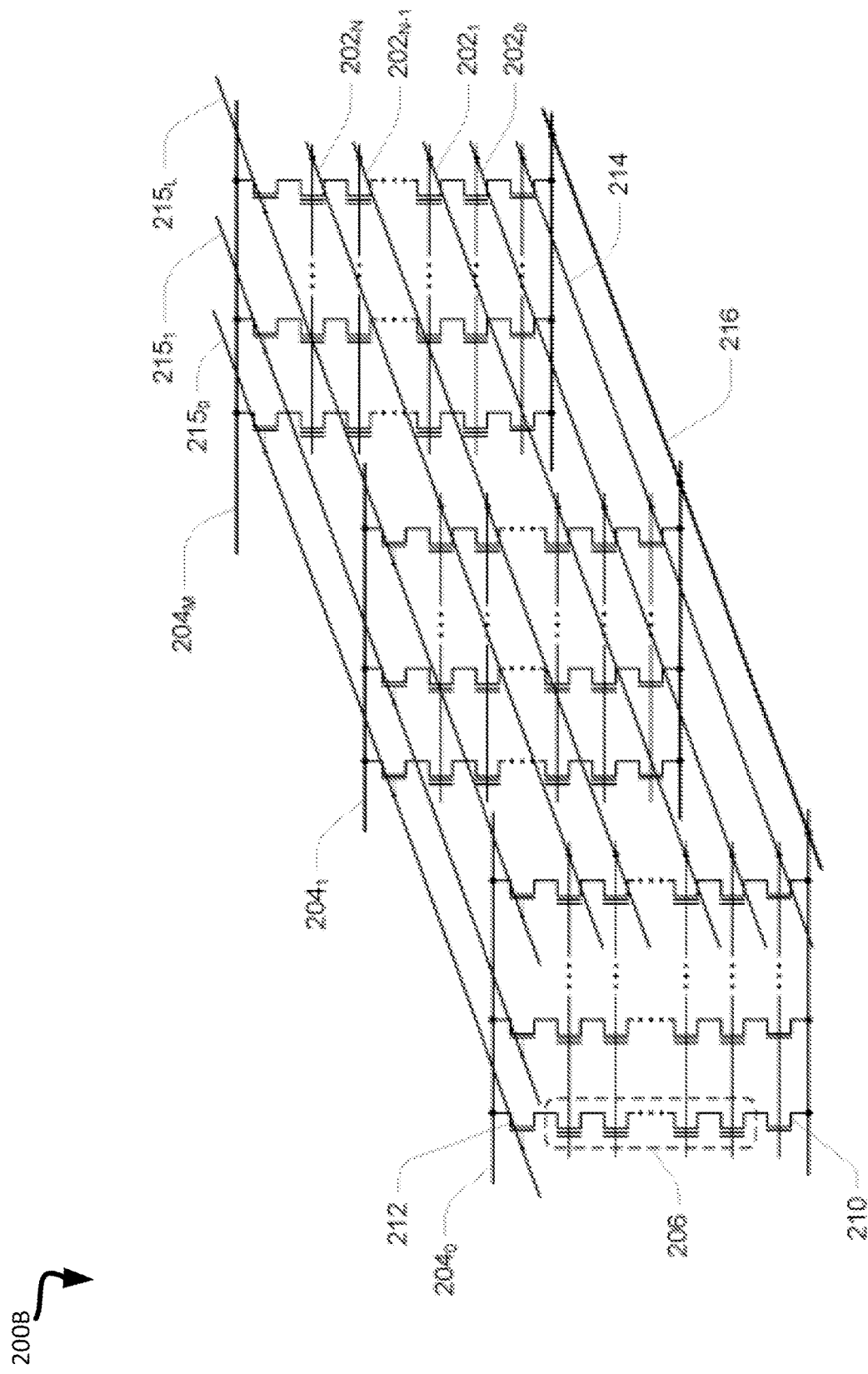
Figure 2C:
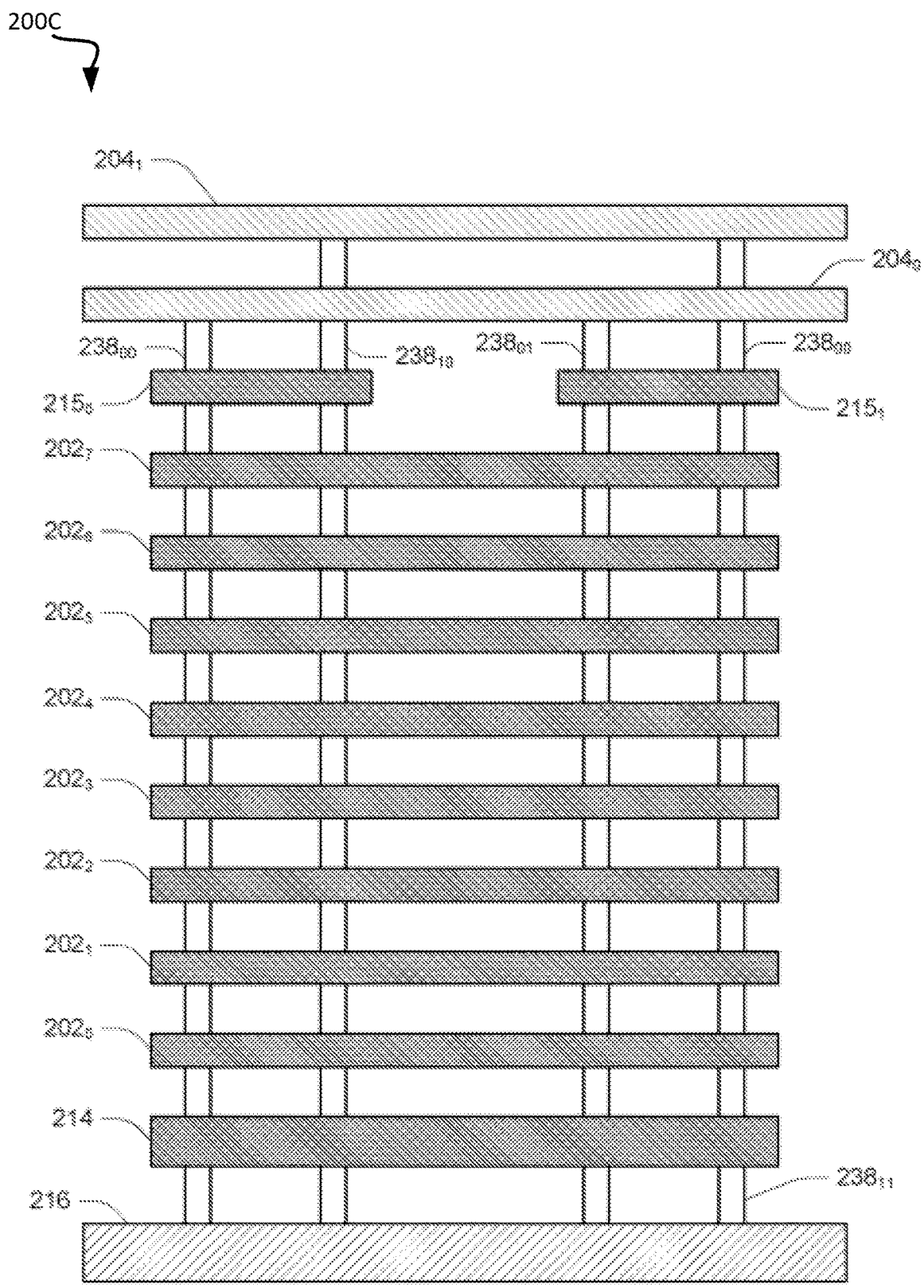

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines 2150-215L to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of a wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
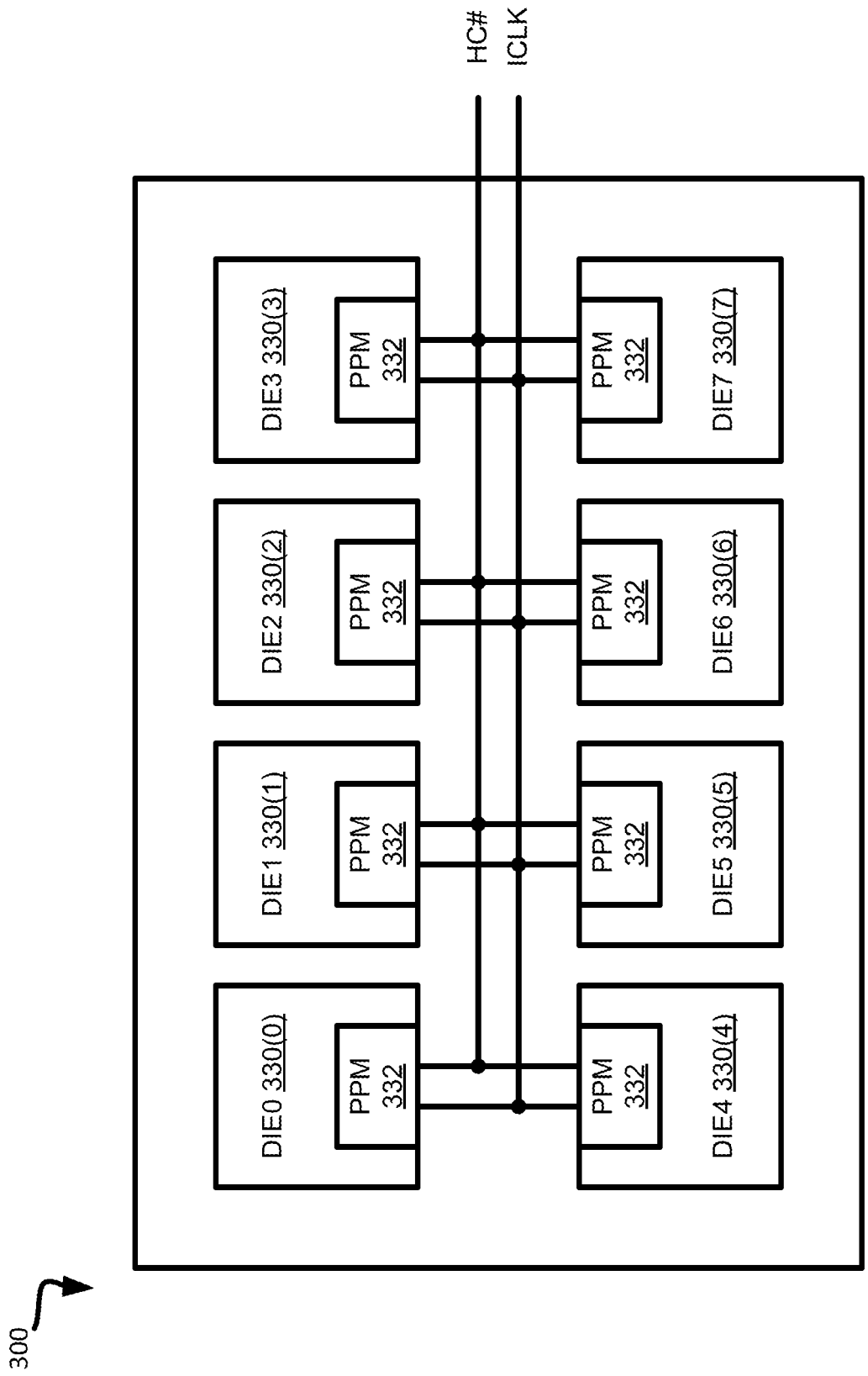
FIG. 3 is a block diagram illustrating a multi-die package with multiple memory dies in a memory sub-system, in accordance with some embodiments of the present disclosure.

FIG. 3 is a block diagram illustrating a multi-die package 300 with multiple memory dies in a memory sub-system, in accordance with some embodiments of the present disclosure. As illustrated, multi-die package 300 includes memory dies 330(0)-330(7). In other embodiments, however, multi-die package 300 can include some other number of memory dies, such as additional or fewer memory dies. In one embodiment, memory dies 330(0)-330(7) share a clock signal ICLK which is received via a clock signal line. Memory dies 330(0)-330(7) can be selectively enabled in response to a chip enable signal (e.g., via a control link), and can communicate over a separate I/O bus. In addition, a peak current magnitude indicator signal HC # is commonly shared between the memory dies 330(0)-330(7). The peak current magnitude indicator signal HC # can be normally pulled to a particular state (e.g., pulled high). In one embodiment, each of memory dies 330(0)-330(7) includes an instance of a PPM component 332, which receives both the clock signal ICLK and the peak current magnitude indicator signal HC #. For example, the PPM component 332 can be a sub-component of DBCC 137 of FIGS. 1A-1B, and as will be described in further detail below with reference to FIG. 5.

In one embodiment, a token-based protocol is used where a token cycles through each of the memory dies 330(0)-330(7) for determining and broadcasting expected peak current magnitude, even though some of the memory dies 330(0)-330(7) might be disabled in response to their respective chip enable signal. The period of time during which a given DBCC 137 holds this token (e.g., a certain number of cycles of clock signal ICLK) can be referred to herein as a power management cycle of the associated memory die. At the end of the power management cycle, the token is passed to another memory die. Eventually the token is received again by the same PPM component 332, which signals the beginning of the power management cycle for the associated memory die. In one embodiment, the encoded value for the lowest expected peak current magnitude is configured such that each of its digits correspond to the normal logic level of the peak current magnitude indicator signal HC # where the disabled dies do not transition the peak current magnitude indicator signal HC #. In other embodiments, however, the memory dies can be configured, when otherwise disabled in response to their respective chip enable signal, to drive transitions of the peak current magnitude indicator signal HC # to indicate the encoded value for the lowest expected peak current magnitude upon being designated. When a given DBCC 137 holds the token, it can determine the peak current magnitude for the respective one of memory die 330(0)-330(7), which can be attributable to one or more processing threads on that memory die, and broadcast an indication of the same via the peak current magnitude indicator signal HC #. During a given power management cycle, the PPM component 332 can arbitrate among the multiple processing threads on the respective memory die using one of a number of different arbitration schemes in order to allocate that peak current to enable concurrent memory access operations.

Figure 4:
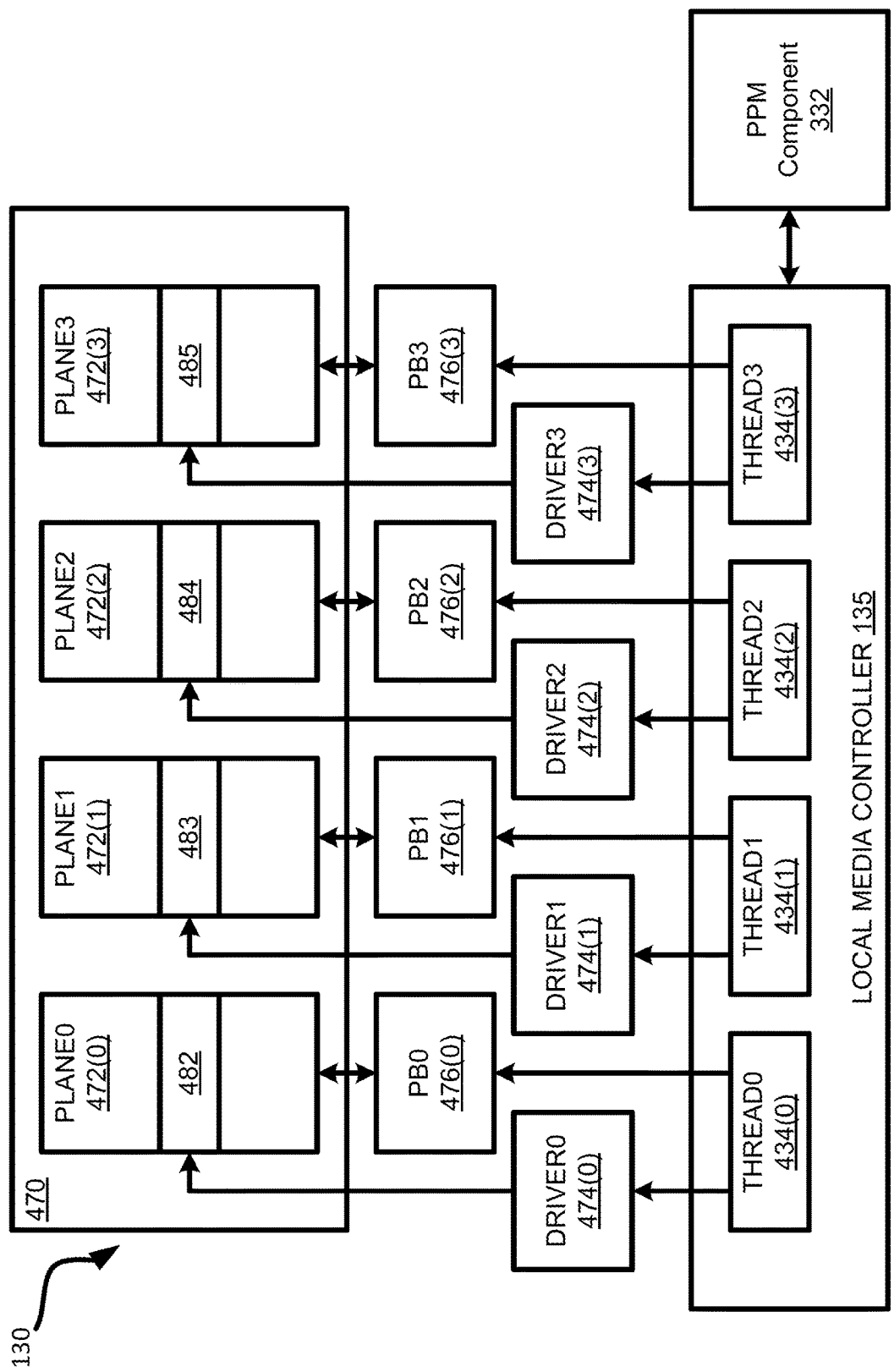
FIG. 4 is a block diagram illustrating a multi-plane memory device configured for independent parallel plane access, in accordance with some embodiments of the present disclosure.

FIG. 4 is a block diagram illustrating a multi-plane memory device 130 configured for independent parallel plane access, in accordance with some embodiments of the present disclosure. The memory planes 472(0)-472(3) can each be divided into blocks of data, with a different relative block of data from two or more of the memory planes 472(0)-472(3) concurrently accessible during memory access operations. For example, during memory access operations, two or more of data block 482 of the memory plane 472(0), data block 483 of the memory plane 472(1), data block 484 of the memory plane 472(2), and data block 485 of the memory plane 4372(3) can each be accessed concurrently.

The memory device 130 includes a memory array 470 divided into memory planes 472(0)-472(3) that each includes a respective number of memory cells. The multi-plane memory device 130 can further include local media controller 135, including a power control circuit and access control circuit for concurrently performing memory access operations for different memory planes 472(0)-472(3). The memory cells can be non-volatile memory cells, such as NAND flash cells, or can generally be any type of memory cells.

The memory planes 472(0)-472(3) can each be divided into blocks of data, with a different relative block of data from each of the memory planes 472(0)-472(3) concurrently accessible during memory access operations. For example, during memory access operations, data block 482 of the memory plane 472(0), data block 483 of the memory plane 472(1), data block 484 of the memory plane 472(2), and data block 485 of the memory plane 472(3) can each be accessed concurrently.

Each of the memory planes 472(0)-472(3) can be coupled to a respective page buffer 476(0)-476(3). Each page buffer 476(0)-476(3) can be configured to provide data to or receive data from the respective memory plane 472(0)-472(3). The page buffers 476(0)-476(3) can be controlled by local media controller 135. Data received from the respective memory plane 472(0)-472(3) can be latched at the page buffers 476(0)-476(3), respectively, and retrieved by local media controller 135, and provided to the memory sub-system controller 115 via the interface.

Each of the memory planes 472(0)-472(3) can be further coupled to a respective access driver circuit 474(0)-474(3), such as an access line driver circuit. The driver circuits 474(0)-474(3) can be configured to condition a page of a respective block of an associated memory plane 472(0)-472(3) for a memory access operation, such as programming data (i.e., writing data), reading data, or erasing data. Each of the driver circuits 474(0)-474(3) can be coupled to a respective global access lines associated with a respective memory plane 472(0)-472(3). Each of the global access lines can be selectively coupled to respective local access lines within a block of a plane during a memory access operation associated with a page within the block. The driver circuits 474(0)-474(3) can be controlled based on signals from local media controller 135. Each of the driver circuits 474(0)-474(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 474(0)-474(3) and page buffers 476(0)-476(3) to concurrently perform memory access operations associated with each of a group of memory command and address pairs (e.g., received from memory sub-system controller 115). For example, local media controller 135 can control the driver circuits 474(0)-474(3) and page buffer 476(0)-476(3) to perform the concurrent memory access operations. Local media controller 135 can include a power control circuit that serially configures two or more of the driver circuits 474(0)-474(3) for the concurrent memory access operations, and an access control circuit configured to control two or more of the page buffers 476(0)-476(3) to sense and latch data from the respective memory planes 472(0)-472(3), or program data to the respective memory planes 472(0)-472(3) to perform the concurrent memory access operations.

In operation, local media controller 135 can receive a group of memory command and address pairs via the bus, with each pair arriving in parallel or serially. In some examples, the group of memory command and address pairs can each be associated with different respective memory planes 472(0)-472(3) of the memory array 470. The local media controller 135 can be configured to perform concurrent memory access operations (e.g., read operations or program operations) for the different memory planes 472(0)-472(3) of the memory array 470 responsive to the group of memory command and address pairs. For example, the power control circuit of local media controller 135 can serially configure, for the concurrent memory access operations based on respective page type (e.g., UP, TP, LP, XP, SLC/MLC/TLC/QLC page), the driver circuits 474(0)-474(3) for two or more memory planes 472(0)-472(3) associated with the group of memory command and address pairs. After the access line driver circuits 474(0)-474(3) have been configured, the access control circuit of local media controller 135 can concurrently control the page buffers 476(0)-476(3) to access the respective pages of each of the two or more memory planes 472(0)-472(3) associated with the group of memory command and address pairs, such as retrieving data or writing data, during the concurrent memory access operations. For example, the access control circuit can concurrently (e.g., in parallel and/or contemporaneously) control the page buffers 476(0)-476(3) to charge/discharge bitlines, sense data from the two or more memory planes 472(0)-472(3), and/or latch the data.

Based on the signals received from local media controller 135, the driver circuits 474(0)-474(3) that are coupled to the memory planes 472(0)-472(3) associated with the group of memory command and address command pairs can select blocks of memory or memory cells from the associated memory plane 472(0)-472(3), for memory operations, such as read, program, and/or erase operations. The driver circuits 474(0)-474(3) can drive different respective global access lines associated with a respective memory plane 472(0)-472(3). As an example, the driver circuit 474(0) can drive a first voltage on a first global access line associated with the memory plane 472(0), the driver circuit 474(1) can drive a second voltage on a third global access line associated with the memory plane 472(1), the driver circuit 474(2) can drive a third voltage on a seventh global access line associated with the memory plane 472(2), etc., and other voltages can be driven on each of the remaining global access lines. In some examples, pass voltages can be provided on all access lines except an access line associated with a page of a memory plane 472(0)-472(3) to be accessed. The local media controller 135, the driver circuits 474(0)-474(3) can allow different respective pages, and the page buffers 476(0)-476(3) within different respective blocks of memory cells, to be accessed concurrently. For example, a first page of a first block of a first memory plane can be accessed concurrently with a second page of a second block of a second memory plane, regardless of page type.

The page buffers 476(0)-476(3) can provide data to or receive data from the local media controller 135 during the memory access operations responsive to signals from the local media controller 135 and the respective memory planes 472(0)-472(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 474(0)-474(3) can concurrently access different respective pages within different respective blocks of different memory planes when the different respective pages are of a different page type. For example, local media controller 135 can include a number of different processing threads, such as processing threads 434(0)-434(3). Each of processing threads 434(0)-434(3) can be associated with a respective one of memory planes 472(0)-472(3), or a respective group of memory planes, and can manage operations performed on the respective plane or group of planes. For example, each of processing threads 434(0)-434(3) can provide control signals to the respective one of driver circuits 474(0)-474(3) and page buffers 476(0)-476(3) to perform those memory access operations concurrently (e.g., at least partially overlapping in time). Since the processing threads 434(0)-434(3) can perform the memory access operations, each of processing threads 434(0)-434(3) can have different current requirements at different points in time. PPM component 332 can determine the power budget needs of processing threads 434(0)-434(3) in a given power management cycle and identify one or more of processing threads 434(0)-434(3) using one of a number of power budget arbitration schemes described herein. The one or more processing threads 434(0)-434(3) can be determined based on an available power budget in the memory sub-system 110 during the power management cycles. For example, PPM component 332 can determine respective priorities of processing threads 434(0)-434(3), and allocate current to processing threads 434(0)-434(3) based on the respective priorities.

FIG. 5 is a diagram of a system 500 for implementing PPM data burst communication, in accordance with some embodiments of the present disclosure. As shown, the system 500 includes the memory device 130 (i.e., memory die) and the memory device 140 (i.e., memory die) of FIGS. 1A-1B. More specifically, the memory device 130 and the memory device 140 can be memory dies of a PPM network. Other memory devices (not shown) may be included in the PPM network. The memory device 130 can include the local media controller 135 and the DBCC 137 described above with reference to FIGS. 1A-1B. The DBCC 137 can include the PPM component 332 of FIGS. 3-4, and detector circuitry ("detector") 510. The PPM component 332 and the detector 510 are operatively coupled to implement PPM data burst communication. Although not shown in FIG. 5, the memory device 140 can similarly include a local media controller and DBCC.

For example, the detector 510 can monitor a data burst (e.g., read burst or write burst) received from a host system (e.g., host system 120 of FIG. 1A) via a memory sub-system controller (e.g., memory sub-system controller 115 of FIGS. 1A-1B). The data burst corresponds to a memory access operation with respect to a die of a PPM network. For example, the data burst can be a read burst to read data from a memory array of the die, or a write burst to write data to the memory array of the die.

The detector 510 can identify a timing mode from the data burst. For example, the detector 510 can detect a period of the data burst, and identify the timing mode of the data burst based on the period.

In some embodiments, the timing mode is a maximum timing mode. For example, the detector 510 can detect a current reservation trigger (e.g., a preamble period of the data burst or a data I/O start command), and identify the timing mode as the maximum timing mode. The maximum timing mode can reflect a theoretical maximum data transfer speed for the data burst. The maximum timing mode can be viewed as a default timing mode for what the data burst is initially detected, due to the lack of information regarding data transfer speed during the data burst.

In some embodiments, the timing mode is an actual timing mode. For example, control logic can analyze a number of I/O cycles of the data burst, and identify the actual timing mode based on the analysis. The actual timing mode reflects an actual data transfer speed category. One example of an actual timing mode is an idle timing mode reflecting an idle data transfer speed category. For example, if the detector 510 detects an idle period (e.g., a data pause occurs or the data burst goes into its postamble period), then the detector 510 can identify the timing mode as the idle timing mode. Other examples of actual timing mode values include a low-speed timing mode reflecting a low data transfer speed category, a mid-speed timing mode reflecting an intermediate data transfer speed category, and a high-speed timing mode reflecting a high data transfer speed category. As an illustrative example, the low data transfer speed category can define data transfer speeds of greater than 0 T/s and less than about 800 MT/s, the intermediate data transfer speed category can define data transfer speeds of greater than or equal to about 800 MT/s and less than about 2400 MT/s, and the high data transfer speed category can define data transfer speeds of greater than or equal to about 2400 MT/s. In such embodiments, the maximum data transfer speed can be greater than or equal to about 3600 MT/s.

After identifying the timing mode, the detector 510 can send a timing mode value representing the timing mode to the PPM component 332. As will be described in further detail below, the timing mode value is a value that can be used by the PPM component 332 to identify the timing mode. For example, sending the timing mode value can include sending a data burst communication signal to the PPM component 332. The data burst communication signal can include a bit pattern representing the timing mode value. In some embodiments, the bit pattern is a two-bit pattern representing four timing modes (e.g., idle, low-speed, mid-speed and high-speed). For example, the two-bit pattern can be represented by values 0x0, 0x1, 0x2 and 0x3. For example, 0x0 can represent the idle timing mode, 0x1 can represent the low-speed timing mode, 0x2 can represent the mid-speed timing mode, and 0x3 can represent the high-speed timing mode. However, such an example should not be considered limiting. Further details regarding the operations of the detector 510 are described above with reference to FIG. 1A and will be described below with reference to FIGS. 7A-7B.

Upon receipt of the timing mode value (e.g., the bit pattern of the data burst communication signal), the PPM component 332 can identify a current consumption value from the timing mode value. More specifically, the PPM component 332 can convert the timing mode value into a current consumption value. For example, the PPM component 332 can convert a maximum timing mode value identifying the maximum timing mode into a current consumption value with respect to the maximum data transfer speed. As another example, the PPM component 332 can convert an actual timing mode value identifying an actual timing mode (e.g., idle value, low-speed value, mid-speed value, or high-speed value) into a corresponding current consumption value with respect to the actual data transfer speed.

In some embodiments, converting the timing mode value into the current consumption value can include converting the timing mode value into the current consumption value using a current consumption data structure. For example, the current consumption data structure can be used to translate the timing mode value (e.g., bit pattern) into a timing mode, and then translate the timing mode into the current consumption value. Translating the timing mode into the current consumption value can include determining the current consumption value from a base current consumption value. For example, the current consumption data structure can assign each timing mode with a respective multiplier, and the current consumption value for the timing mode can be determined by multiplying the base current consumption value by its corresponding multiplier. Illustratively, a multiplier of 0 can be assigned to the idle value, a multiplier of A can be assigned to the low-speed value, a multiplier of B can be assigned to the intermediate speed value, and a multiplier of C can be assigned to the high-speed value, where 0<A<B<C. If the base current consumption value is X mA, then the current consumption value for the idle value is 0, the current consumption value for the low-speed value is AX, the current consumption value for the intermediate speed value is BX, and the current consumption value for the high-speed value is CX. Further details regarding the current consumption data structure will be described below with reference to FIG. 6.

After identifying the current consumption value, the PPM component can set the current consumption value as an amount of current, and then reserve the amount of current for handling the data burst by communicating the amount of current to other dies of the PPM (e.g., the PPM component of the memory device 140). For example, if a previously reserved amount of current is less than the amount of current, the PPM component 332 can request additional current from the available current budget equal to the difference between the amount of current and a previously reserved amount of current (e.g., when requesting an amount of current corresponding to the maximum current consumption value). As another example, if the previously reserved amount of current is greater than the amount of current, the PPM component 332 can release excess current budget to the other dies of the PPM network (e.g., when requesting an amount of current corresponding to an actual current consumption value that is less than the previously reserved amount of current corresponding to the maximum current consumption value). Additionally, if there is insufficient available current budget within the PPM network (e.g., the available current budget is less than difference between the amount of current and the previously reserved amount of current), the PPM component 332 can wait for sufficient current to be made available by the other dies of the PPM network.

After reserving the amount of current, the PPM component 332 can then cause the local media controller 135 to handle the data burst. Further details regarding the operations of the PPM component 332 and the local media controller 135 are described above with reference to FIG. 1A and will be described below with reference to FIGS. 7A and 7C.

FIG. 6 is a diagram of a current consumption data structure ("data structure") 600, in accordance with some embodiments of the present disclosure. The data structure 600 is shown as a table including a number of columns 610-640. More specifically, column 610 is a bit pattern column where each entry is a timing mode value of a respective timing mode, column 620 is a timing mode column where each entry is a respective timing mode, column 630 is a multiplier column where each entry is a respective multiplier of a base current consumption value X ("multiplier"), and column 640 is a current consumption value column where each entry is a respective current consumption value (i.e., the product of X and a respective multiplier). In some embodiments, the timing mode values are respective bit patterns.

In this illustrative example, the bit patterns are two-bit patterns each having a respective hexadecimal value. However, such an example should not be considered limiting. For example, the first row of the data structure 600 corresponds to the idle timing mode having a timing mode value of 0x0. The second row of the data structure 600 corresponds to the low-speed timing mode having a timing mode value of 0x1. The third row of the data structure 600 corresponds the mid-speed timing mode having a timing mode value of 0x2. The fourth row of the data structure 600 corresponds to the high-speed timing mode having a timing mode value of 0x3.

The data structure 600 can be stored on a memory device for use by a PPM component of a PPM network. Upon receiving a timing mode value from a detector of the memory device, the PPM component can convert the timing mode value into a respective current consumption value for the respective timing mode. For example, the timing mode value can be received as a bit pattern of a data burst communication signal generated by the detector. The PPM component can reserve an amount of current reflected by the corresponding current consumption value by communicating the current consumption value to other PPM components of a token ring group of the PPM network. Further details regarding the data structure 600, including timing mode values, timing modes, multipliers and current consumption values, as well as reserving amounts of current, are described above with reference to FIGS. 1A and 5, and will be described below with reference to FIGS. 7A-7C.

Figure 7A:
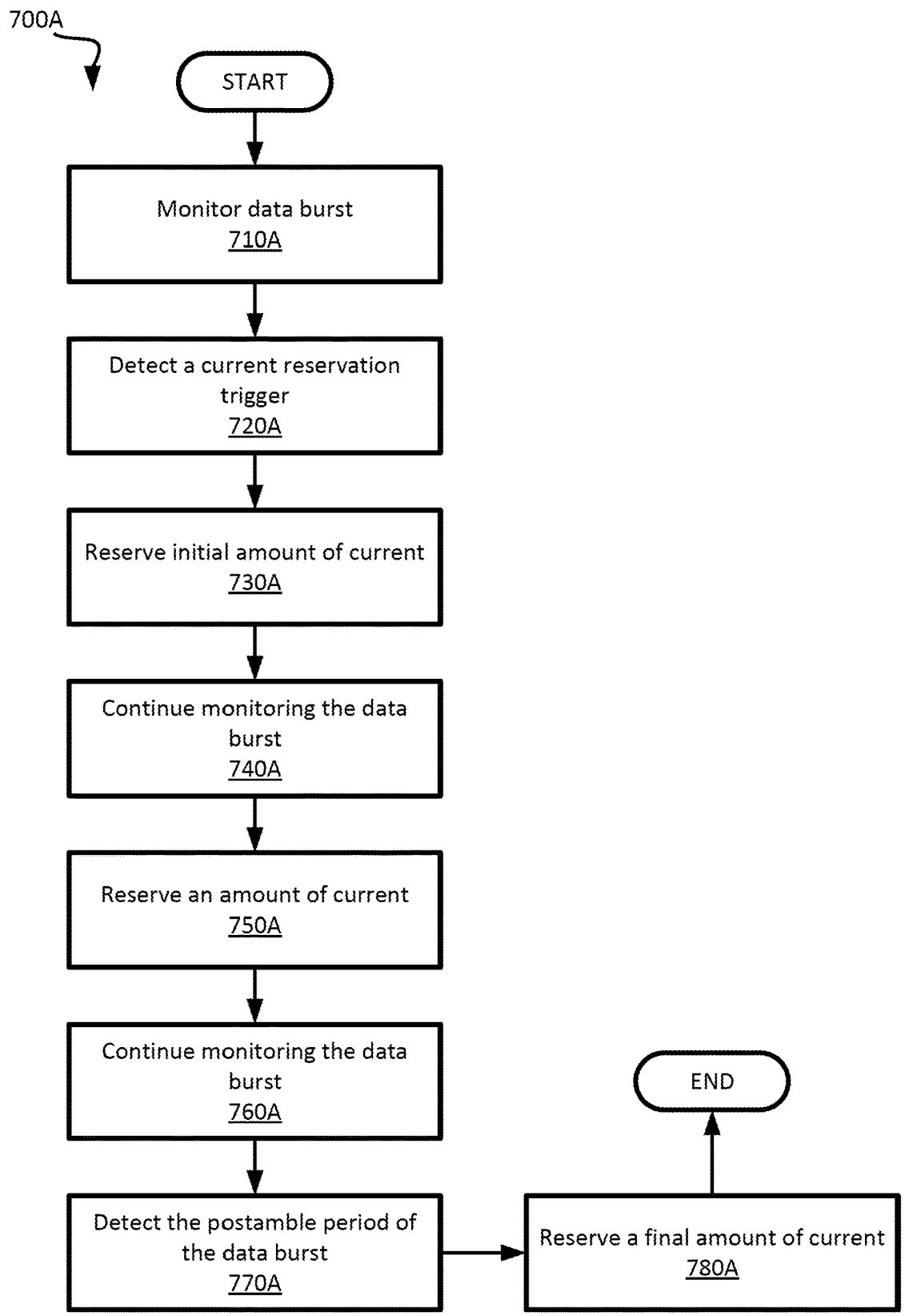
FIGS. 7A-7C are flow diagrams of methods to implement peak power management (PPM) data burst communication, in accordance with some embodiments of the present disclosure.

FIG. 7A is a flow diagram of a method 700A to implement PPM data burst communication, in accordance with some embodiments of the present disclosure. The method 700A can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700A is performed by the DBCC 137 of FIGS. 1A-1B and FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710A, a data burst is monitored. For example, control logic can monitor a data burst received from a host system (e.g., host system 120 of FIG. 1A) via a memory sub-system controller (e.g., memory sub-system controller 115 of FIG. 1A). The data burst corresponds to a memory access operation with respect to a die of a PPM network. For example, the data burst can be a read burst to read data from a memory array of the die, or a write burst to write data to the memory array of the die.

At operation 720A, a current reservation trigger is detected. For example, control logic can detect the current reservation trigger by analyzing a set of control signals. In some embodiments, detecting the current reservation trigger includes detecting a preamble period of the data burst. More specifically, the analysis of the set of control signals can be used to detect a point in time in which the data burst enters the preamble period (e.g., after an idle period). In some embodiments, detecting the current reservation trigger include detecting a data I/O start command.

At operation 730A, an initial amount of current is reserved. For example, control logic can, in response to detecting the current reservation trigger, set a maximum current consumption value as the initial amount of current, and reserve the initial amount of current by communicating the initial amount of current to at least one other die of a PPM network via a token ring protocol. The maximum current consumption value can reflect a theoretical maximum current consumption for the data burst. More specifically, the maximum current consumption value reflects a maximum data transfer speed of the data burst. In some embodiments, the maximum data transfer speed can be greater than or equal to about 3600 MT/s.

If there is sufficient available current budget within the PPM network, then the initial amount of current can be reserved immediately. If there is insufficient available current budget within the PPM network, there may be a delay until sufficient current budget is made available within the PPM network (e.g., after at least one other die of the PPM network releases extra current budget).

At operation 740A, monitoring of the data burst continues. For example, control logic can continue monitoring the data burst to detect a number of I/O cycles of the data burst following the detection of the current reservation trigger (e.g., following the detection of the preamble period or the data I/O start command).

At operation 750A, a subsequent amount of current is reserved. For example, control logic can, in response to detecting the number of I/O cycles, set an actual current consumption value as the subsequent amount of current, and reserve the subsequent amount of current by communicating the subsequent amount of current to the at least one other die of the PPM network via the token ring protocol. Since the actual current consumption value is less than or equal to the maximum current consumption value, there is already sufficient current budget reserved by the die to reserve the actual current consumption value. A portion of the initial amount of current can be released to increase the available current budget of the PPM network (i.e., the difference between the maximum current consumption value and the actual current consumption value).

More specifically, reserving the subsequent amount of current can include identifying an actual timing mode by analyzing the number of I/O cycles, and converting the actual timing mode into the actual current consumption value. The actual timing mode reflects an actual data transfer speed category. One example of an actual timing mode is an idle timing mode reflecting an idle data transfer speed category. Examples of actual timing mode values include a low-speed timing mode reflecting a low data transfer speed category, a mid-speed timing mode reflecting an intermediate data transfer speed category, and a high-speed timing mode reflecting a high data transfer speed category. As an illustrative example, the low data transfer speed category can define data transfer speeds of greater than 0 T/s and less than about 800 MT/s, the intermediate data transfer speed category can define data transfer speeds of greater than or equal to about 800 MT/s and less than about 2400 MT/s, and the high data transfer speed category can define data transfer speeds of greater than or equal to about 2400 MT/s.

In some embodiments, converting the actual timing mode into the actual current consumption value can include converting an actual timing mode value defining the actual timing mode into the actual current consumption value using a current consumption data structure. For example, the current consumption data structure can be used to translate the actual timing mode value (e.g., bit pattern) into the actual timing mode, and then translate the actual timing mode into the actual current consumption value. Translating the actual timing mode into the actual current consumption value can include determining the actual current consumption value from a base current consumption value. For example, the current consumption data structure can assign each actual timing mode with a respective multiplier, and the actual current consumption value for the actual timing mode can be determined by multiplying the base current consumption value by its corresponding multiplier. Illustratively, a multiplier of 0 can be assigned to the idle value, a multiplier of A can be assigned to the low-speed value, a multiplier of B can be assigned to the intermediate speed value, and a multiplier of C can be assigned to the high-speed value, where $0<A<B<C$. If the base current consumption value is X mA, then the actual current consumption value for the idle value is 0, the actual current consumption value for the low-speed value is AX, the actual current consumption value for the intermediate speed value is BX, and the actual current consumption value for the high-speed value is CX.

At operation 760A, monitoring of the data burst continues. For example, control logic can continue monitoring the data burst to detect a postamble period of the data burst following the number of I/O cycles.

At operation 770A, the postamble period of the data burst is detected. For example, control logic can detect the postamble period by analyzing the set of control signals. The postamble period can correspond to an idle timing mode of the data burst.

At operation 780A, a final amount of current is reserved. For example, control logic can, in response to detecting the postamble period, set an idle current consumption value as the final amount of current, and reserve the final amount of current by communicating the final amount of current to the at least one other die of the PPM network via the token ring protocol. The idle current consumption value is less than the subsequent current consumption value. For example, the idle current consumption value can be 0 mA. Since the idle current consumption value is less than or equal to the actual current consumption value, then at least a portion of the subsequent amount of current can be released to increase the available current budget of the PPM network (i.e., the difference between the actual current consumption value and the idle current consumption value). Further details regarding operations 710A-780A are described above with reference to FIGS. 1A and 5-6 and will now be described below with reference to FIGS. 7B-7C.

Figure 7B:
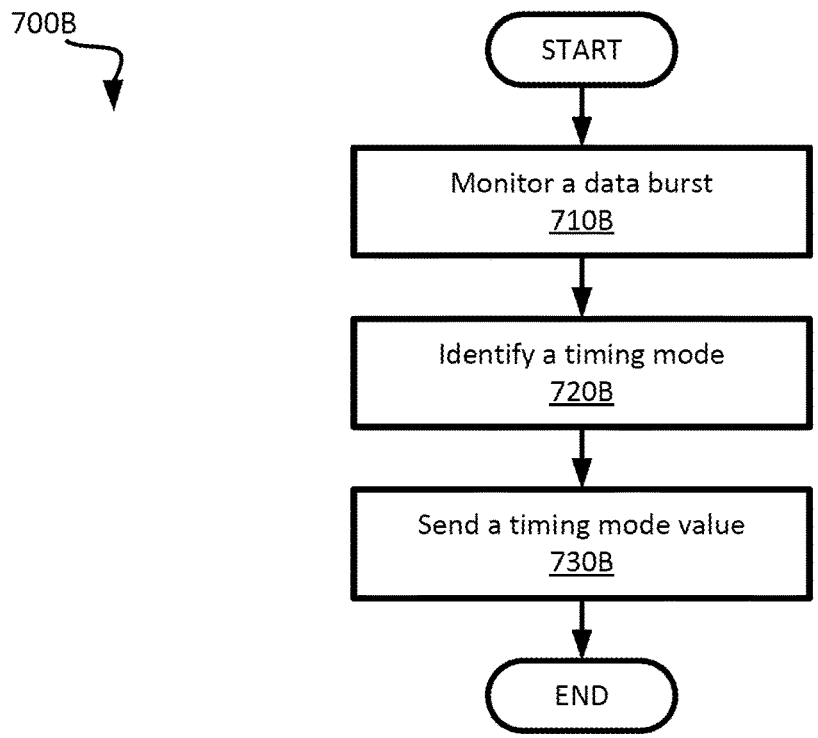

FIG. 7B is a flow diagram of a method 700B to implement PPM data burst communication, in accordance with some embodiments of the present disclosure, in accordance with some embodiments of the present disclosure. The method 700B can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700B is performed by the DBCC 137 of FIGS. 1A-1B and FIG. 5. More specifically, the method 700B can be performed by the detector 510 of FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710B, a data burst is monitored. For example, control logic can monitor a data burst received from a host system (e.g., host system 120 of FIG. 1A) via a memory sub-system controller (e.g., memory sub-system controller 115 of FIG. 1A). The data burst corresponds to a memory access operation with respect to a die of a PPM network. For example, the data burst can be a read burst to read data from a memory array of the die, or a write burst to write data to the memory array of the die.

At operation 720B, a timing mode is identified. For example, control logic can detect a period of the data burst, and identify the timing mode of the data burst based on the period. In some embodiments, the timing mode is a maximum timing mode. For example, control logic can detect a current reservation trigger (e.g., preamble period of the data burst or data I/O start command), and identify the timing mode as the maximum timing mode. The maximum timing mode can reflect a theoretical maximum data transfer speed for the data burst. The maximum timing mode can be viewed as a default timing mode for what the data burst is initially detected, due to the lack of information regarding data transfer speed during the data burst.

In some embodiments, the timing mode is an actual timing mode. For example, control logic can analyze a number of I/O cycles of the data burst, and identify the actual timing mode based on the analysis. The actual timing mode reflects an actual data transfer speed category. One example of an actual timing mode is an idle timing mode reflecting an idle data transfer speed category. For example, if control logic detects an idle period (e.g., a data pause occurs or the data burst goes into its postamble period), then control logic can identify the timing mode as the idle timing mode. Other examples of actual timing mode values include a low-speed timing mode reflecting a low data transfer speed category, a mid-speed timing mode reflecting an intermediate data transfer speed category, and a high-speed timing mode reflecting a high data transfer speed category. As an illustrative example, the low data transfer speed category can define data transfer speeds of greater than 0 T/s and less than about 800 MT/s, the intermediate data transfer speed category can define data transfer speeds of greater than or equal to about 800 MT/s and less than about 2400 MT/s, and the high data transfer speed category can define data transfer speeds of greater than or equal to about 2400 MT/s. In such embodiments, the maximum data transfer speed can be greater than or equal to about 3600 MT/s.

At operation 730B, a timing mode value is sent. For example, control logic can send the timing mode value to a PPM component. The timing mode value is a value that can be used by the PPM component to identify the timing mode. More specifically, as will be described in further detail below with reference to FIG. 7C, the PPM component can convert the timing mode value into a current consumption value that can be set as an amount of current to be reserved for handling the data burst. For example, the PPM component can convert a maximum timing mode value identifying the maximum timing mode into a current consumption value with respect to the maximum data transfer speed. As another example, the PPM component can convert an actual timing mode value identifying an actual timing mode (e.g., idle value, low-speed value, mid-speed value, or high-speed value) into a corresponding current consumption value with respect to the actual data transfer speed.

For example, sending the timing mode value can include sending a data burst communication signal to the PPM component. The data burst communication signal can include a bit pattern representing the timing mode value. In some embodiments, the bit pattern is a two-bit pattern representing four timing modes (e.g., idle, low-speed, mid-speed and high-speed). For example, the two-bit pattern can be represented by values 0x0, 0x1, 0x2 and 0x3. For example, 0x0 can represent the idle timing mode, 0x1 can represent the low-speed timing mode, 0x2 can represent the mid-speed timing mode, and 0x3 can represent the high-speed timing mode. However, such an example should not be considered limiting. Further details regarding operations 710B-730B are described above with reference to FIGS. 1A and 5-7A and will now be described below with reference to FIG. 7C.

Figure 7C:
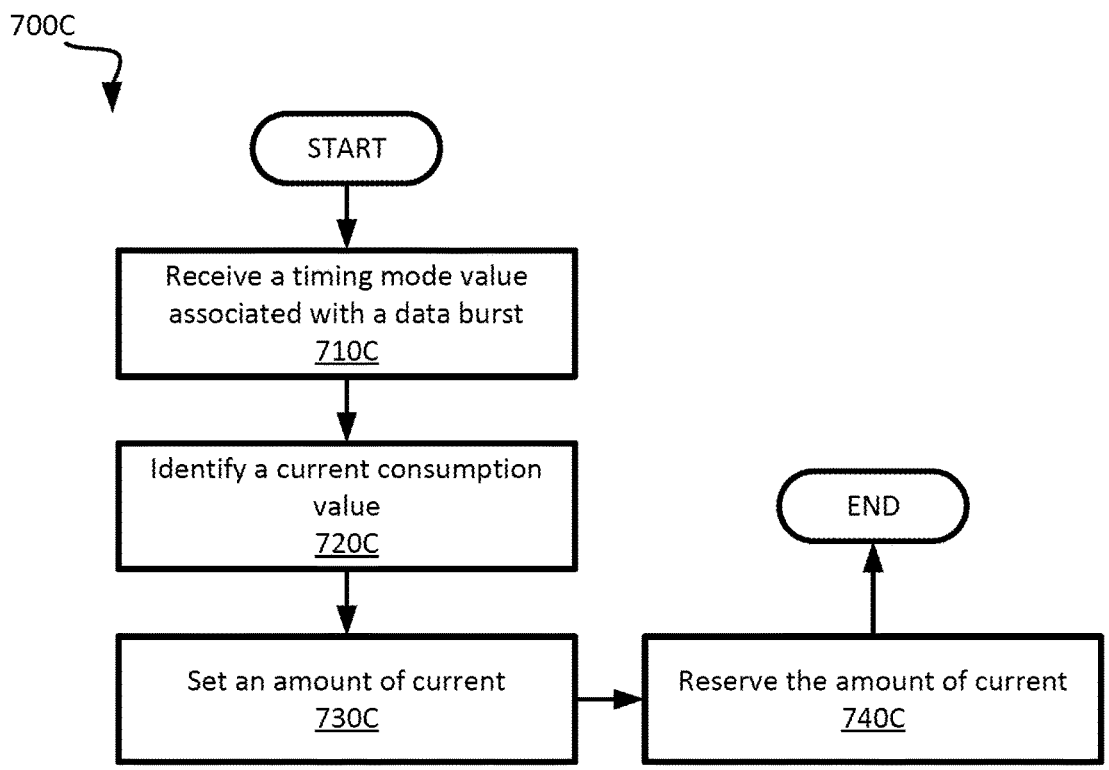

FIG. 7C is a flow diagram of a method 700C to implement PPM data burst communication, in accordance with some embodiments of the present disclosure, in accordance with some embodiments of the present disclosure. The method 700C can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700C is performed by the DBCC 137 of FIGS. 1A-1B and FIG. 5. More specifically, the method 700C can be performed by the PPM component 332 of FIGS. 3-5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710C, a timing mode value associated with a data burst is received. For example, control logic can receive the timing mode value from a detector via a communication protocol. The data burst can be, for example, a write burst or a read burst. The timing mode value corresponds to a timing mode reflecting a data burst speed category. In some embodiments, the timing mode value is a maximum timing mode value. In some embodiments, the timing mode value is an actual timing mode value. For example, the actual timing mode value can be one of: an idle value, a low-speed value, a mid-speed value, or a high-speed value.

For example, receiving the timing mode value can include receiving a data burst communication signal from the detector. The data burst communication signal can include a bit pattern representing the timing mode value. In some embodiments, the bit pattern is a two-bit pattern representing four timing modes (e.g., idle, low-speed, mid-speed and high-speed). For example, the two-bit pattern can be represented by values 0x0, 0x1, 0x2 and 0x3. For example, 0x0 can represent the idle timing mode, 0x1 can represent the low-speed timing mode, 0x2 can represent the mid-speed timing mode, and 0x3 can represent the high-speed timing mode. However, such an example should not be considered limiting.

At operation 720C, a current consumption value is identified. For example, control logic can convert the timing mode value into the current consumption value. In some embodiments, converting the timing mode value into the current consumption value can include converting the timing mode value into the current consumption value using a current consumption data structure. For example, the current consumption data structure can be used to translate the timing mode value (e.g., bit pattern) into a timing mode, and then translate the timing mode into the current consumption value. Translating the timing mode into the current consumption value can include determining the current consumption value from a base current consumption value. For example, the current consumption data structure can assign each timing mode with a respective multiplier, and the current consumption value for the timing mode can be determined by multiplying the base current consumption value by its corresponding multiplier. Illustratively, a multiplier of 0 can be assigned to the idle value, a multiplier of A can be assigned to the low-speed value, a multiplier of B can be assigned to the intermediate speed value, and a multiplier of C can be assigned to the high-speed value, where 0<A<B<C. If the base current consumption value is X mA, then the current consumption value for the idle value is 0, the current consumption value for the low-speed value is AX, the current consumption value for the intermediate speed value is BX, and the current consumption value for the high-speed value is CX.

At operation 730C, an amount of current is set and, at operation 740C the amount of current is reserved. For example, control logic can set the current consumption value as the amount of current, and control logic can reserve the amount of current by communicating the amount of current to other dies of the PPM network (e.g., to their respective PPM components). Upon determining that there is sufficient available current budget (e.g., the available current budget is greater than or equal to the amount of current), control logic can then cause a local media controller to handle the data burst. Further details regarding operations 710C-740C are described above with reference to FIGS. 1A and 5-7B.

Figure 8:
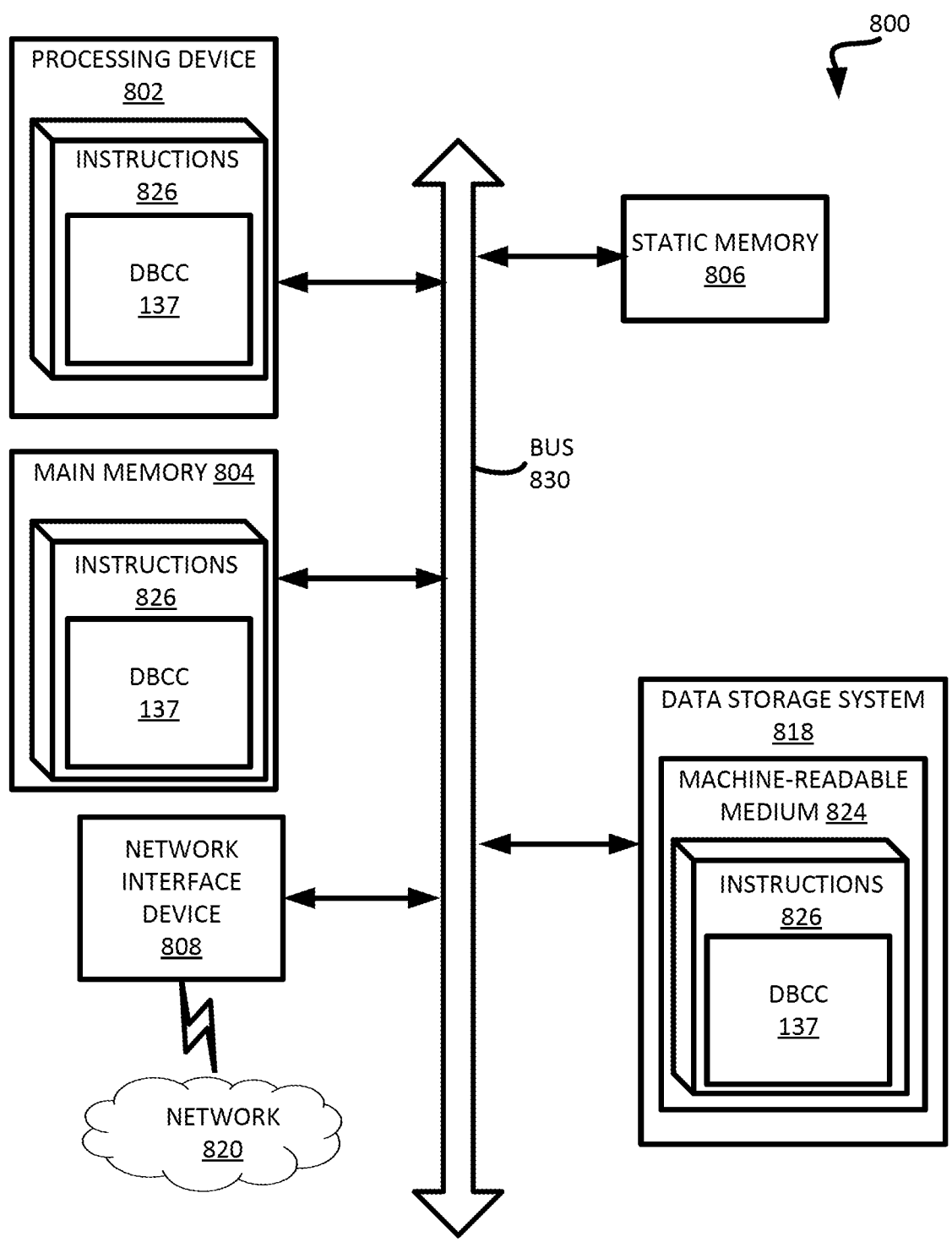
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the local media controller 135 and/or the DBCC 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to a local media controller and/or PPM component (e.g., the local media controller 135 and/or the DBCC 137 of FIG. 1A). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a plurality of memory dies, each memory die of the plurality of memory dies comprising;
a memory array; and
control logic, operatively coupled with the memory array, to perform operations for implementing peak power management (PPM) data burst communication, the operations comprising:
monitoring a data burst with respect to the memory array;
detecting a current reservation trigger associated with the data burst;
in response detecting the current reservation trigger, reserving an initial amount of current reflecting a maximum current consumption value associated with a maximum data transfer speed of the data burst;
detecting a plurality of input/output cycles of the data burst following a preamble period of the data burst; and
in response to detecting the plurality of input/output cycles, reserving, based on an analysis of the plurality of input/output cycles, a subsequent amount of current reflecting an actual current consumption value associated with an actual data transfer speed of the data burst.

2. The memory device of claim 1, wherein the operations further comprise:

detecting a postamble period of the data burst following the plurality of input/output cycles, wherein the postamble period corresponds to an idle timing mode of the data burst; and
in response to detecting the postamble period, reserving a final amount of current reflecting an idle current consumption value associated with the data burst.

3. The memory device of claim 1, wherein the maximum current consumption value corresponds to a maximum timing mode of the data burst, and wherein the actual current consumption value corresponds to an actual timing mode of the data burst determined from the analysis of the plurality of input/output cycles.

4. The memory device of claim 1, wherein:
reserving the initial amount of current comprises communicating the initial amount of current to other memory dies of the plurality of memory dies via a token ring protocol; and
reserving the subsequent amount of current comprises communicating the subsequent amount of current to the other memory dies via the token ring protocol.

5. The memory device of claim 1, wherein reserving the subsequent amount of current comprises converting, using a current consumption data structure, an actual timing mode value defining an actual timing mode of the data burst into the actual current consumption value.

6. The memory device of claim 5, wherein the actual timing mode value corresponds to a multiplier of a base current consumption value, and wherein converting the actual timing mode value into the actual current consumption value comprises determining the actual current consumption value by multiplying the base current consumption value by the multiplier.

7. The memory device of claim 1, wherein detecting the current reservation trigger comprises detecting at least one of: the preamble period of the data burst, or a data input/output start command.

8. A method comprising:
monitoring, by a processing device, a data burst with respect to a memory array of a memory die of a peak power management (PPM) network;
detecting, by the processing device, a current reservation trigger associated with the data burst;
in response detecting the current reservation trigger, reserving, by the processing device, an initial amount of current reflecting a maximum current consumption value associated with a maximum data transfer speed of the data burst;
detecting, by the processing device, a plurality of input/output cycles of the data burst following a preamble period of the data burst; and
in response to detecting the plurality of input/output cycles, reserving, by the processing device based on an analysis of the plurality of input/output cycles, a subsequent amount of current reflecting an actual current consumption value associated with an actual data transfer speed of the data burst.

9. The method of claim 8, further comprising:
detecting, by the processing device, a postamble period of the data burst following the plurality of input/output cycles, wherein the postamble period corresponds to an idle timing mode of the data burst; and
in response to detecting the postamble period, reserving, by the processing device, a final amount of current reflecting an idle current consumption value associated with the data burst.

10. The method of claim 8, wherein the maximum current consumption value corresponds to a maximum timing mode of the data burst, and wherein the actual current consumption value corresponds to an actual timing mode of the data burst determined from the analysis of the plurality of input/output cycles.

11. The method of claim 8, wherein:
reserving the initial amount of current comprises communicating the initial amount of current to other memory dies of the PPM network via a token ring protocol; and
reserving the subsequent amount of current comprises communicating the subsequent amount of current to the other memory dies of the PPM network via the token ring protocol.

12. The method of claim 8, wherein reserving the subsequent amount of current comprises converting, using a current consumption data structure, an actual timing mode value defining an actual timing mode of the data burst into the actual current consumption value.

13. The method of claim 12, wherein the actual timing mode value corresponds to a multiplier of a base current consumption value, and wherein converting the actual timing mode value into the actual current consumption value comprises determining the actual current consumption value by multiplying the base current consumption value by the multiplier.

14. The method of claim 8, wherein detecting the current reservation trigger comprises detecting at least one of: the preamble period of the data burst, or a data input/output start command.

15. A memory device comprising:
a plurality of memory dies, each memory die of the plurality of memory dies comprising;
a memory array; and
control logic, operatively coupled with the memory array, to perform operations for implementing peak power management (PPM) data burst communication, the operations comprising:
receiving a timing mode value defining a timing mode associated with a data transfer speed of a data burst with respect to the memory array;
converting, by using a base current consumption value, the timing mode value into a current consumption value; and
reserving an amount of current for the data burst based on the current consumption value.

16. The memory device of claim 15, wherein reserving the amount of current comprises communicating the amount of current to other memory dies of the plurality of memory dies via a token ring protocol.

17. The memory device of claim 15, wherein the timing mode value is a maximum timing mode value defining a maximum timing mode associated with a maximum data transfer speed of the data burst, wherein the current consumption value is a maximum current consumption value, and wherein the amount of current reflects the maximum current consumption value.

18. The memory device of claim 15, wherein the timing mode value is an actual timing mode value defining an actual timing mode associated with an actual data transfer speed of the data burst, wherein the current consumption value is an actual current consumption value, and wherein the amount of current reflects the actual current consumption value.

19. The memory device of claim 15, wherein:
the timing mode value corresponds to a multiplier of a base current consumption value; and
converting the timing mode value into the current consumption value by using the base current consumption value comprises converting, using a current consumption data structure, the timing mode value into the current consumption value by multiplying the base current consumption value by the multiplier.

20. The memory device of claim 15, wherein the timing mode value is an idle timing mode value defining an idle timing mode associated with an idle data transfer speed of the data burst, wherein the current consumption value is an idle current consumption value, and wherein the amount of current reflects the idle current consumption value.

* * * * *